United States Patent
Shin et al.

(10) Patent No.: US 12,061,973 B2
(45) Date of Patent: Aug. 13, 2024

(54) NEURAL PROCESSING DEVICE AND TRANSACTION TRACKING METHOD THEREOF

(71) Applicant: Rebellions Inc., Seongnam-si (KR)

(72) Inventors: Wongyu Shin, Seongnam-si (KR); Kyeongryeol Bong, Seongnam-si (KR)

(73) Assignee: Rebellions Inc., Seongnam-si (KR)

(*) Notice: Subject to any disclaimer, the term of this patent is extended or adjusted under 35 U.S.C. 154(b) by 0 days.

(21) Appl. No.: 17/938,027

(22) Filed: Oct. 4, 2022

(65) Prior Publication Data
US 2023/0214635 A1 Jul. 6, 2023

(30) Foreign Application Priority Data
Dec. 30, 2021 (KR) ........................ 10-2021-0192183

(51) Int. Cl.
*G06N 3/063* (2023.01)
*G06F 9/54* (2006.01)
*G06F 12/00* (2006.01)

(52) U.S. Cl.
CPC .............. *G06N 3/063* (2013.01); *G06F 12/00* (2013.01)

(58) Field of Classification Search
CPC ........... G06N 3/063; G06N 3/08; G06N 3/04; G06N 20/00; G06F 12/10
USPC ........ 711/103, 100, 113, 118, 130, 147, 168, 711/12.011, 12.008
See application file for complete search history.

(56) References Cited

U.S. PATENT DOCUMENTS

| | | | |
|---|---|---|---|
| 9,720,819 B2* | 8/2017 | Anderson | G06F 12/00 |
| 11,593,273 B2* | 2/2023 | Patel | G06F 12/0895 |
| 2007/0198781 A1* | 8/2007 | Dice | G06F 12/0806 |
| | | | 711/E12.041 |
| 2011/0055493 A1 | 3/2011 | Kottapalli et al. | |
| 2011/0179230 A1* | 7/2011 | Chou | G06F 9/467 |
| | | | 711/108 |
| 2013/0160028 A1 | 6/2013 | Black | |
| 2015/0212851 A1* | 7/2015 | Busaba | G06F 9/38585 |
| | | | 711/151 |
| 2019/0243651 A1 | 8/2019 | Venkataramani et al. | |

(Continued)

FOREIGN PATENT DOCUMENTS

KR 10-2258566 B1 6/2021

OTHER PUBLICATIONS

Avni, Hillel et al., Hardware Transactions in Nonvolatile Memory, 2015, Springer-Verlag Berlin Heidelberg, Y. Moses (Ed.): DISC 2015, LNCS 9363, pp. 617-630 (Year: 2015).*

(Continued)

*Primary Examiner* — Sanjiv Shah
*Assistant Examiner* — Edward Waddy, Jr.
(74) *Attorney, Agent, or Firm* — BROADVIEW IP LAW, PC

(57) ABSTRACT

A neural processing device and transaction tracking method thereof are provided. The neural processing device comprises a first set of a plurality of neural cores, a shared memory shared by the first set of the plurality of neural cores, and a programmable hardware transactional memory (PHTM) configured to receive a memory access request directed to the shared memory from the first set of the plurality of neural cores and configured to commit or buffer the memory access request.

20 Claims, 32 Drawing Sheets

(56) References Cited

U.S. PATENT DOCUMENTS

2020/0073830 A1   3/2020   Verrilli et al.

OTHER PUBLICATIONS

Avni, Hillel et al. (2015). "Hardware Transactions in Nonvolatile Memory", Lecture Notes in Computer Science. In: Moses, Y. (eds) Distributed Computing. DISC 2015. vol 9363. p. 617-630. Springer, Berlin, Heidelberg. DOI:10.1007/978-3-662-48653-5_41.
Extended European Search Report for EP 22213511.3 by European Patent Office dated Apr. 24, 2023.
Office Action for KR 10-2021-0192183 by Korean Intellectual Property Office dated Mar. 25, 2024.

\* cited by examiner

Program Access Scenario → Program Access Scenario area

1001b

NEURAL PROCESSING DEVICE AND TRANSACTION TRACKING METHOD THEREOF

CROSS-REFERENCE TO RELATED APPLICATION

This application claims priority under 35 U.S.C § 119 to Korean Patent Application No. 10-2021-0192183 filed in the Korean Intellectual Property Office on Dec. 30, 2021, the entire contents of which are hereby incorporated by reference.

TECHNICAL FIELD

The disclosure relates to a neural processing device and a transaction tracking method thereof. More particularly, the disclosure relates to, for example, but not limited to, a neural processing device that performs transaction tracking using a programmable hardware transactional memory (PHTM) and a transaction tracking method thereof.

BACKGROUND

For the last few years, artificial intelligence technology has been the core technology of the Fourth Industrial Revolution and the subject of discussion as the most promising technology worldwide. The biggest problem with such artificial intelligence technology is computing performance. For artificial intelligence technology which realizes human learning ability, reasoning ability, perceptual ability, natural language implementation ability, etc., it is of utmost important to process a large amount of data quickly.

The central processing unit (CPU) or graphics processing unit (GPU) of off-the-shelf computers was used for deep-learning training and inference in early artificial intelligence, but had limitations on the tasks of deep-learning training and inference with high workloads, and thus, neural processing units (NPUs) that are structurally specialized for deep learning tasks have received a lot of attention.

Since such a neural processing unit includes a large number of processing units and cores inside thereof, the synchronization of these modules is required to be clearly processed according to the dependency of a task. In conventional processing units, a control processor or centralized controller centrally controlled these synchronization signals and managed operations in order.

However, such a method can result in a lot of latency in synchronization processing and increased overhead of the control processor as more and more processing units and cores are included in the neural processing unit.

Alternatively, a method of managing completely software-wise rather than the control processor can also be used. In this case, delays may occur in the tasks of each processing unit and core until the synchronization is completed depending on the dependency.

The description set forth in the background section should not be assumed to be prior art merely because it is set forth in the background section. The background section may describe aspects or embodiments of the present disclosure.

SUMMARY

Aspects of the disclosure provide a neural processing device that efficiently manages synchronization by including an appropriately programmed hardware transactional memory.

Aspects of the disclosure provide a transaction tracking method of a neural processing device that efficiently manages synchronization by including an appropriately programmed hardware transactional memory.

According to some aspects of the disclosure, a neural processing device comprises: a first set of a plurality of neural cores; a shared memory shared by the first set of the plurality of neural cores; and a programmable hardware transactional memory (PHTM) configured to receive a memory access request directed to the shared memory from the first set of the plurality of neural cores and configured to commit or buffer the memory access request.

According to some aspects, the neural processing device, further includes: a second set of a plurality of neural cores that are different from the first set of the plurality of neural cores, and the PHTM comprises: a first PHTM configured to receive memory access requests from the first set of the plurality of neural cores; and a second PHTM configured to receive memory access requests from the second set of the plurality of neural cores.

According to some aspects, the neural processing device, the PHTM includes: a third PHTM configured to receive memory access requests from neural cores including the first set of the plurality of neural cores and the second set of the plurality of neural cores.

According to some aspects, the neural processing device, further includes: an L2 sync path configured to transmit synchronization signals received from neural cores including the first set of the plurality of neural cores and the second set of the plurality of neural cores.

According to some aspects, the L2 sync path performs many-to-many connections among neural cores including the first set of the plurality of neural cores and the second set of the plurality of neural cores.

According to some aspects, the L2 sync path performs a one-to-one connection among neural cores including the first set of the plurality of neural cores and the second set of the plurality of neural cores.

According to some aspects, the L2 sync path is a ring-shaped interconnection.

According to some aspects, the PHTM includes: one or more transaction regions that commits or buffers memory access requests; and a non-transaction region that does not track memory access requests.

According to some aspects, an address of a transaction region of the one or more transaction regions is different from an address of another transaction region of the one or more transaction regions.

According to some aspects, a size of a transaction region of the one or more transaction regions is different from a size of another transaction region of the one or more transaction regions.

According to some aspects, the PHTM is further configured to: receive a memory access scenario for a plurality of memory access operation groups, and process memory access requests based on the memory access scenario.

According to some aspects, the memory access scenario indicates a group number, memory access type, a service order and a number of memory accesses for each of plurality of memory access operation groups.

According to some aspects, the PHTM is further configured to: buffer the received memory access request if the received memory access request belongs to one or more memory access operation groups following the current memory access operation group.

According to some aspects, the PHTM is further configured to: commit the received memory access request if the received memory access request belongs to a current memory access operation group and another memory access request is not being processed, and buffer the received memory access request if the received memory access request belongs to the current memory access operation group and another memory access request is being processed.

According to some aspects, a neural processing device includes: a plurality of neural cores; a shared memory shared by the plurality of neural cores; and a programmable hardware transactional memory (PHTM) configured to: receive a memory access scenario for a plurality of memory access operation groups, start one of the plurality of memory access operation groups as a current memory access operation group based on service orders of the plurality of memory access operation groups, receive a memory access request directed to the shared memory from at least one of the plurality of neural cores, determine whether the received memory access request belongs to the current memory access operation group, and commit the received memory access request if the received memory access request belongs to the current memory access operation group.

According to some aspects, the PHTM is further configured to: determine whether another memory access request is being processed, if the received memory access request belongs to the current memory access operation group; and commit the received memory access request if another memory access request is not being processed.

According to some aspects, the PHTM is further configured to: buffer the received memory access request if another memory access request is being processed.

According to some aspects, the PHTM is further configured to: buffer the received memory access request if the received memory access request belongs to a memory access operation group following the current memory access operation group.

According to some aspects, the memory access scenario indicates a group number, a memory access type, a service order, and a number of memory accesses for each of the plurality of memory access operation groups.

According to some aspects of the disclosure, a transaction tracking method of a neural processing device including a programmable hardware transactional memory (PHTM), comprises: receiving a memory access scenario for a plurality of memory access operation groups; starting one of the plurality of memory access operation groups as a current memory access operation group based on service orders of the plurality of memory access operation groups; receiving a memory access request; determining whether the received memory access request belongs to the current memory access operation group; and committing the received memory access request if the received memory access request belongs to the current memory access operation group.

According to some aspects, committing the received memory access request comprises: determining whether another memory access request is being processed; and committing the received memory access request if another memory access request is not being processed.

According to some aspects, committing the received memory access request further comprises: buffering the received memory access request if another memory access request is being processed.

According to some aspects, the transaction tracking method of a neural processing device, further comprises: buffering the received memory access request if the received memory access request belongs to a memory access operation group following the current memory access operation group.

Aspects of the disclosure are not limited to those mentioned above, and other objects and advantages of the disclosure that have not been mentioned can be understood by the following description, and will be more clearly understood by embodiments of the disclosure. In addition, it will be readily understood that the objects and advantages of the disclosure can be realized by the means and combinations thereof set forth in the claims.

The neural processing device and the transaction tracking method thereof of the disclosure can minimize the synchronization waiting time of the neural cores by allowing the memory access requests to be managed directly by hardware.

In addition, the performance of the device can be improved through request processing without aborting while minimizing hardware complexity by setting transaction regions and using grouping.

In addition to the foregoing, the specific effects of the disclosure will be described together while elucidating the specific details for carrying out the embodiments below.

DETAILED DESCRIPTION OF THE PREFERRED EMBODIMENTS

Figure 1:
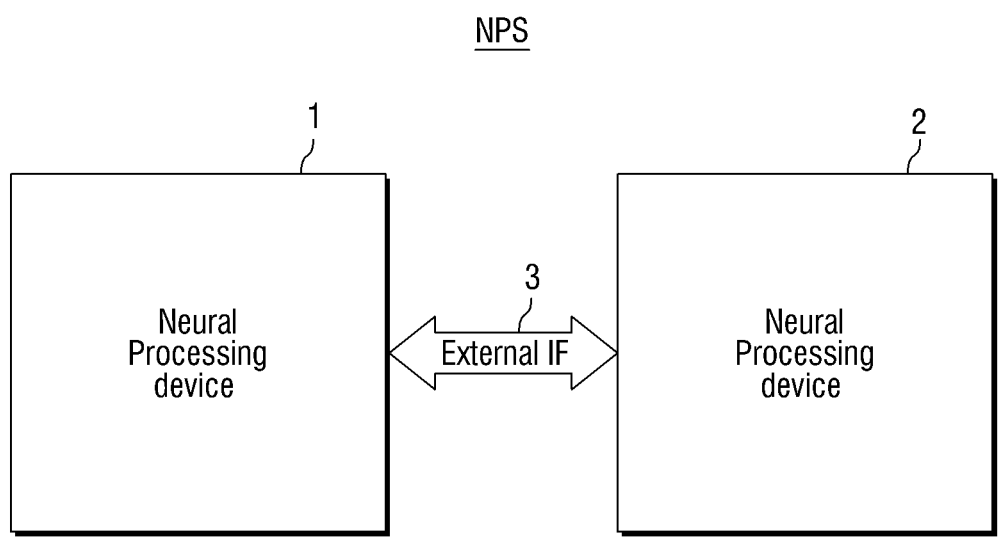
FIG. 1 is a block diagram for illustrating a neural processing system in accordance with some embodiments.

The terms or words used in the disclosure and the claims should not be construed as limited to their ordinary or lexical meanings. They should be construed as the meaning and concept in line with the technical idea of the disclosure based on the principle that the inventor can define the concept of terms or words in order to describe his/her own embodiments in the best possible way. Further, since the embodiment described herein and the configurations illustrated in the drawings are merely one embodiment in which the disclosure is realized and do not represent all the technical ideas of the disclosure, it should be understood that there may be various equivalents, variations, and applicable examples that can replace them at the time of filing this application.

Although terms such as first, second, A, B, etc. used in the description and the claims may be used to describe various components, the components should not be limited by these terms. These terms are used only for the purpose of distinguishing one component from another. For example, a first component may be referred to as a second component, and similarly, a second component may be referred to as a first component, without departing from the scope of the disclosure. The term 'and/or' includes a combination of a plurality of related listed items or any item of the plurality of related listed items.

The terms used in the description and the claims are merely used to describe particular embodiments and are not intended to limit the disclosure. Singular expressions include plural expressions unless the context explicitly indicates otherwise. In the application, terms such as "comprise," "have," "include", "contain," etc. should be understood as not precluding the possibility of existence or addition of features, numbers, steps, operations, components, parts, or combinations thereof described herein.

When a part is said to include "at least one of a, b or c", this means that the part may include only a, only b, only c, both a and b, both a and c, both b and c, all of a, b and c, or any combination thereof.

Unless otherwise defined, all terms used herein, including technical or scientific terms, have the same meaning as commonly understood by those of ordinary skill in the art to which the disclosure pertains.

Terms such as those defined in commonly used dictionaries should be construed as having a meaning consistent with the meaning in the context of the relevant art, and are not to be construed in an ideal or excessively formal sense unless explicitly defined in the disclosure.

In addition, each configuration, procedure, process, method, or the like included in each embodiment of the disclosure may be shared to the extent that they are not technically contradictory to each other.

In the following, a neural processing device in accordance with some embodiments will be described with reference to FIGS. 1 to 26.

FIG. 1 is a block diagram for illustrating a neural processing system in accordance with some embodiments.

Referring to FIG. 1, a neural processing system NPS in accordance with some embodiments may include a first neural processing device 1, a second neural processing device 2, and an external interface 3.

The first neural processing device 1 may be a device that performs calculations using an artificial neural network. The first neural processing device 1 may be, for example, a device specialized in performing the task of deep learning calculations. However, the embodiment is not limited thereto.

The second neural processing device 2 may be a device having the same or similar configuration as the first neural processing device 1. The first neural processing device 1 and the second neural processing device 2 may be connected to each other via the external interface 3 and share data and control signals.

Although FIG. 1 shows two neural processing devices, the neural processing system NPS in accordance with some embodiments is not limited thereto. That is, in a neural processing system NPS in accordance with some embodiments, three or more neural processing devices may be connected to each other via the external interface 3. Also, conversely, a neural processing system NPS in accordance with some embodiments may include only one neural processing device.

Figure 2:
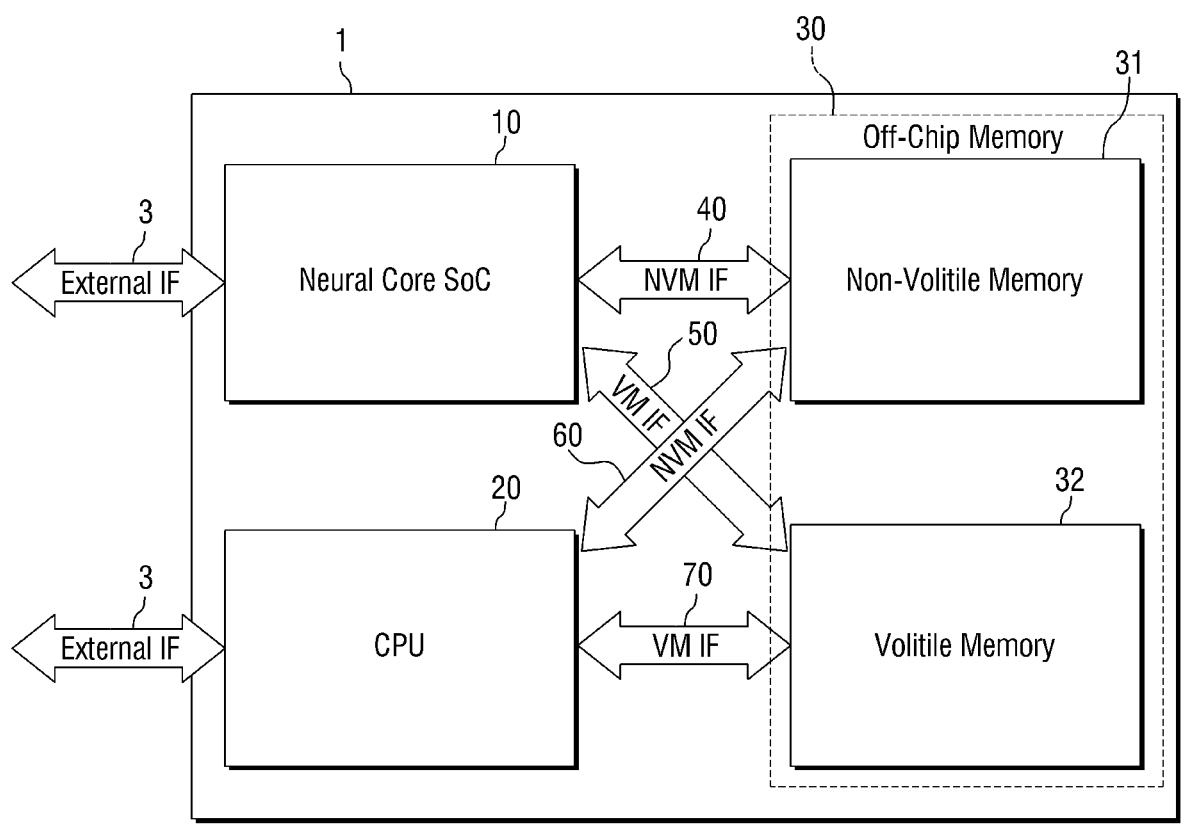
FIG. 2 is a block diagram for illustrating the neural processing device of FIG. 1.

FIG. 2 is a block diagram for illustrating the neural processing device of FIG. 1.

Referring to FIG. 2, the first neural processing device 1 may include a neural core SoC 10, a CPU 20, an off-chip memory 30, a first non-volatile memory interface 40, a first volatile memory interface 50, a second non-volatile memory interface 60, and a second volatile memory interface 70. The off-chip memory 30 may include a non-volatile memory 31 and a volatile memory 32.

The neural core SoC 10 may be a system on a chip device. The neural core SoC 10 is an artificial intelligence calculation device and may be an accelerator. The neural core SoC 10 may be, for example, any one of a graphics processing unit (GPU), a field-programmable gate array (FPGA), and an application-specific integrated circuit (ASIC). However, the embodiment is not limited thereto.

The neural core SoC 10 may exchange data with other external calculation devices via the external interface 3. Further, the neural core SoC 10 may be connected to the non-volatile memory 31 and the volatile memory 32 via the first non-volatile memory interface 40 and the first volatile memory interface 50, respectively.

The CPU 20 may be a control device that controls the system of the first neural processing device 1 and executes program calculations. The CPU 20 is a general-purpose calculation device and may have low efficiency in performing simple parallel calculations that are used a lot in deep learning. Accordingly, there can be high efficiency by performing calculations in deep learning inference and training tasks by the neural core SoC 10.

The CPU 20 may exchange data with other external calculation devices via the external interface 3. In addition, the CPU 20 may be connected to the non-volatile memory 31 and the volatile memory 32 via the second non-volatile memory interface 60 and the second volatile memory interface 70, respectively.

The off-chip memory 30 may be a memory disposed outside the chip of the neural core SoC 10.

The non-volatile memory 31 may be a memory that continuously retains stored information even if electric power is not supplied. The non-volatile memory 31 may include, for example, at least one of Read-Only Memory (ROM), Programmable Read-Only Memory (PROM), Erasable Alterable ROM (EAROM), Erasable Programmable Read-Only Memory (EPROM), Electrically Erasable Programmable Read-Only Memory (EEPROM) (e.g., NAND Flash memory, NOR Flash memory), Ultra-Violet Erasable Programmable Read-Only Memory (UVEPROM), Ferroelectric Random-Access Memory (FeRAM), Magnetoresistive Random-Access Memory (MRAM), Phase-change Random-Access Memory (PRAM), silicon-oxide-nitride-oxide-silicon (SONOS), Resistive Random-Access Memory (RRAM), Nanotube Random-Access Memory (NRAM), magnetic computer storage devices (e.g., hard disks, diskette drives, magnetic tapes), optical disc drives, or 3D XPoint memory. However, the embodiment is not limited thereto.

The volatile memory 32 may be a memory that continuously requires electric power to retain stored information, unlike the non-volatile memory 31. The volatile memory 32 may include, for example, at least one of Dynamic Random-Access Memory (DRAM), Static Random-Access Memory (SRAM), Synchronous Dynamic Random-Access Memory (SDRAM), or Double Data Rate SDRAM (DDR SDRAM). However, the embodiment is not limited thereto.

Each of the first non-volatile memory interface 40 and the second non-volatile memory interface 60 may include, for example, at least one of Parallel Advanced Technology Attachment (PATA), Small Computer System Interface (SCSI), Serial Attached SCSI (SAS), Serial Advanced Technology Attachment (SATA), or PCI Express (PCIe). However, the embodiment is not limited thereto.

Each of the first volatile memory interface 50 and the second volatile memory interface 70 may be, for example, at least one of SDR (Single Data Rate), DDR (Double Data Rate), QDR (Quad Data Rate), or XDR (eXtreme Data Rate, Octal Data Rate). However, the embodiment is not limited thereto.

Figure 3:
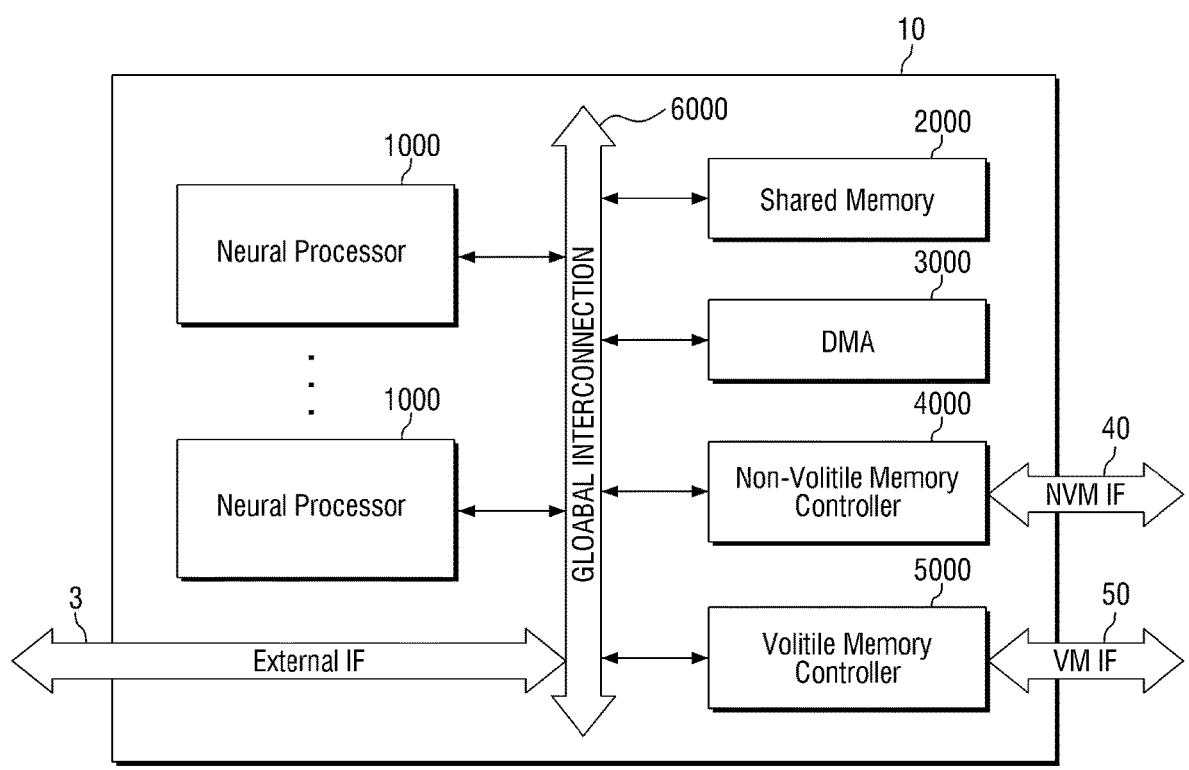
FIG. 3 is a block diagram for illustrating the neural core SoC of FIG. 2.

FIG. 3 is a block diagram for illustrating the neural core SoC of FIG. 2.

Referring to FIGS. 2 and 3, the neural core SoC 10 may include at least one neural processor 1000, a shared memory 2000, direct memory access (DMA) 3000, a non-volatile memory controller 4000, a volatile memory controller 5000, and a global interconnection 6000.

The neural processor 1000 may be a calculation device that directly performs calculation tasks. If there exist neural processors 1000 in plurality, calculation tasks may be assigned to respective neural processors 1000. The respective neural processors 1000 may be connected to each other via the global interconnection 6000.

The shared memory 2000 may be a memory shared by multiple neural processors 1000. The shared memory 2000 may store data of each neural processor 1000. In addition, the shared memory 2000 may receive data from the off-chip memory 30, store them temporarily, and transfer them to each neural processor 1000. On the contrary, the shared memory 2000 may also receive data from the neural processor 1000, store them temporarily, and transfer them to the off-chip memory 30 of FIG. 2.

The shared memory 2000 may need a relatively high-speed memory. Accordingly, the shared memory 2000 may include, for example, an SRAM. However, the embodiment is not limited thereto. That is, the shared memory 2000 may include a DRAM as well.

The shared memory 2000 may be a memory corresponding to the SoC level, i.e., level 3 (L3). Accordingly, the shared memory 2000 may also be represented as an L3 shared memory.

The DMA 3000 may directly control the movement of data without the need for the neural processor 1000 to control the input/output of data. Accordingly, the DMA 3000 may control the data movement between memories, thereby minimizing the number of interrupts of the neural processor 1000.

The DMA 3000 may control the data movement between the shared memory 2000 and the off-chip memory 30. Via the authority of the DMA 3000, the non-volatile memory controller 4000 and the volatile memory controller 5000 may perform the movement of data.

The non-volatile memory controller 4000 may control the task of reading from or writing onto the non-volatile memory 31. The non-volatile memory controller 4000 may control the non-volatile memory 31 via the first non-volatile memory interface 40.

The volatile memory controller 5000 may control the task of reading from or writing onto the volatile memory 32. Further, the volatile memory controller 5000 may perform a refresh task of the volatile memory 32. The volatile memory controller 5000 may control the non-volatile memory 31 via the first volatile memory interface 50.

The global interconnection 6000 may connect the at least one neural processor 1000, the shared memory 2000, the DMA 3000, the non-volatile memory controller 4000, and the volatile memory controller 5000 to one another. In addition, the external interface 3 may also be connected to the global interconnection 6000. The global interconnection 6000 may be a path through which data travels between the at least one neural processor 1000, the shared memory 2000, the DMA 3000, the non-volatile memory controller 4000, the volatile memory controller 5000, and the external interface 3.

The global interconnection 6000 may transmit not only data but also control signals and may transmit a signal for synchronization. That is, in the neural processing device in accordance with some embodiments, each neural processor 1000 may directly transmit and receive a synchronization signal, instead of a separate control processor managing the synchronization signal. Accordingly, it is possible to preclude the latency of the synchronization signal generated by the control processor.

In other words, if there exist neural processors 1000 in plurality, there may be dependencies of individual tasks in which the task of one neural processor 1000 needs to be finished before the next neural processor 1000 can start a new task. The end and start of these individual tasks can be checked via a synchronization signal, and in conventional techniques, a control processor performed the reception of such a synchronization signal and an instruction to start a new task.

However, as the number of neural processors 1000 increases and task dependencies are designed more complicatedly, the number of requests and instructions for this synchronization task has increased exponentially. Therefore, the latency resulting from each request and instruction can greatly reduce the efficiency of tasks.

Accordingly, in the neural processing device in accordance with some embodiments, each neural processor 1000, instead of the control processor, may directly transmit a synchronization signal to another neural processor 1000 according to the dependency of a task. In this case, several neural processors 1000 can perform the synchronization tasks in parallel as compared with the method managed by the control processor, thereby minimizing the latency due to synchronization.

In addition, the control processor needs to perform the task scheduling of the neural processors 1000 according to a task dependency, and the overhead of such scheduling may also increase significantly as the number of neural processors 1000 increases. Accordingly, in the neural processing device in accordance with some embodiments, the scheduling task is also performed by the individual neural processors 1000, and thus, the performance of the device can be improved without even a scheduling burden resulting therefrom.

Figure 4:
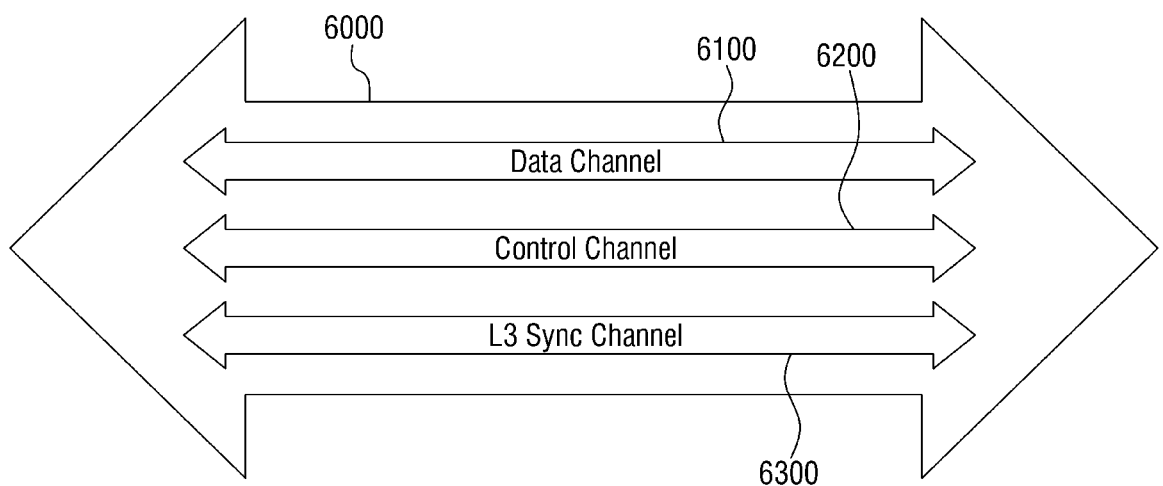
FIG. 4 is a structural diagram for illustrating the global interconnection of FIG. 3.

FIG. 4 is a structural diagram for illustrating the global interconnection of FIG. 3.

Referring to FIG. 4, the global interconnection 6000 may include a data channel 6100, a control channel 6200, and an L3 sync channel 6300.

The data channel 6100 may be a dedicated channel for transmitting data. Through the data channel 6100, the at least one neural processor 1000, the shared memory 2000, the DMA 3000, the non-volatile memory controller 4000, the volatile memory controller 5000, and the external interface 3 may exchange data with one another.

The control channel 6200 may be a dedicated channel for transmitting control signals. Through the control channel 6200, the at least one neural processor 1000, the shared memory 2000, the DMA 3000, the non-volatile memory controller 4000, the volatile memory controller 5000, and the external interface 3 may exchange control signals with one another.

The L3 sync channel 6300 may be a dedicated channel for transmitting synchronization signals. Through the L3 sync channel 6300, the at least one neural processor 1000, the shared memory 2000, the DMA 3000, the non-volatile memory controller 4000, the volatile memory controller 5000, and the external interface 3 may exchange synchronization signals with one another.

The L3 sync channel 6300 may be set as a dedicated channel inside the global interconnection 6000, and thus, may not overlap with other channels and transmit synchronization signals quickly. Accordingly, the neural processing device in accordance with some embodiments does not require new wiring work and may smoothly perform the synchronization task by using the global interconnection 6000.

Figure 5:
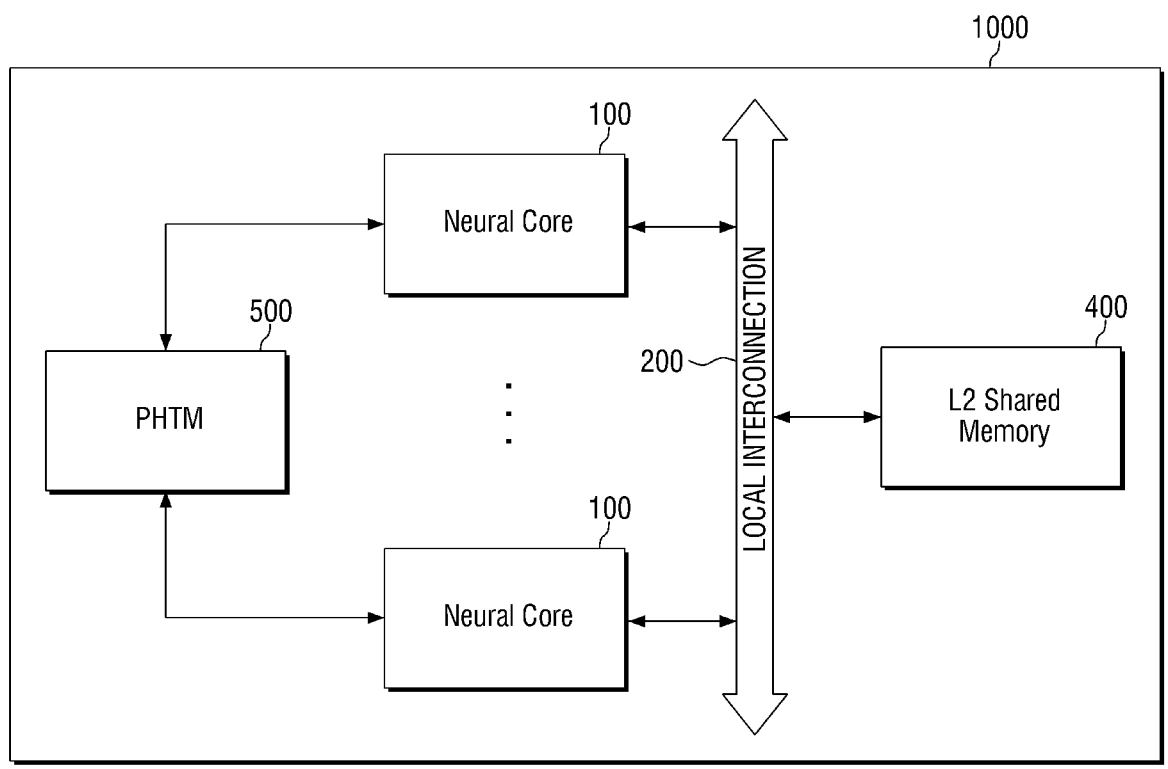
FIG. 5 is a block diagram for illustrating the neural processor of FIG. 3.

FIG. 5 is a block diagram for illustrating the neural processor of FIG. 3.

Referring to FIGS. 3 to 5, the neural processor 1000 may include at least one neural core 100, an L2 shared memory 400, a local interconnection 200, and a programmable hardware transactional memory (PHTM) 500.

The at least one neural core 100 may share and perform the tasks of the neural processor 1000. The number of neural cores 100 may be, for example, eight. However, the embodiment is not limited thereto. FIGS. 4 and 5 illustrate that a plurality of neural cores are included in the neural processor 1000, but the embodiment is not limited thereto. That is, the neural processor 1000 may be configured with only one neural core.

The L2 shared memory 400 may be a memory shared by the neural cores 100 in the neural processor 1000. The L2 shared memory 400 may store data of each neural core 100. In addition, the L2 shared memory 400 may receive data from the shared memory 2000 of FIG. 3, store them temporarily, and transfer them to each neural core 100. On the contrary, the L2 shared memory 400 may also receive data from the neural core 100, store them temporarily, and transfer them to the shared memory 2000 of FIG. 3.

The L2 shared memory 400 may be a memory corresponding to the neural processor level, i.e., level 2 (L2). The L3 shared memory, i.e., the shared memory 2000 may be shared by the neural processors 1000, and the L2 shared memory 400 may be shared by the neural cores 100.

The local interconnection 200 may connect the at least one neural core 100 and the L2 shared memory 400 to each other. The local interconnection 200 may be a path through which data travels between the at least one neural core 100 and the L2 shared memory 400. The local interconnection 200 may be connected and transmit data to the global interconnection 6000 of FIG. 3.

The PHTM 500 may receive and track memory access requests of the at least one neural core. Tracking may refer to determining whether to commit or buffer an operation according to a memory access request and causing a read or write operation to be performed finally. Accordingly, once each neural core merely transmits a memory access request to the PHTM 500, the subsequent tasks may be carried out by the PHTM 500. In the embodiment, since the PHTM 500 performs read and write operations without the need to transmit synchronization signals between the neural cores, the delay due to the synchronization signals of the neural cores can be minimized. In particular, as the larger the number of neural cores increases, the delay due to the synchronization signals may also increase and the synchronization through the PHTM 500 can be more efficient.

Figure 6:
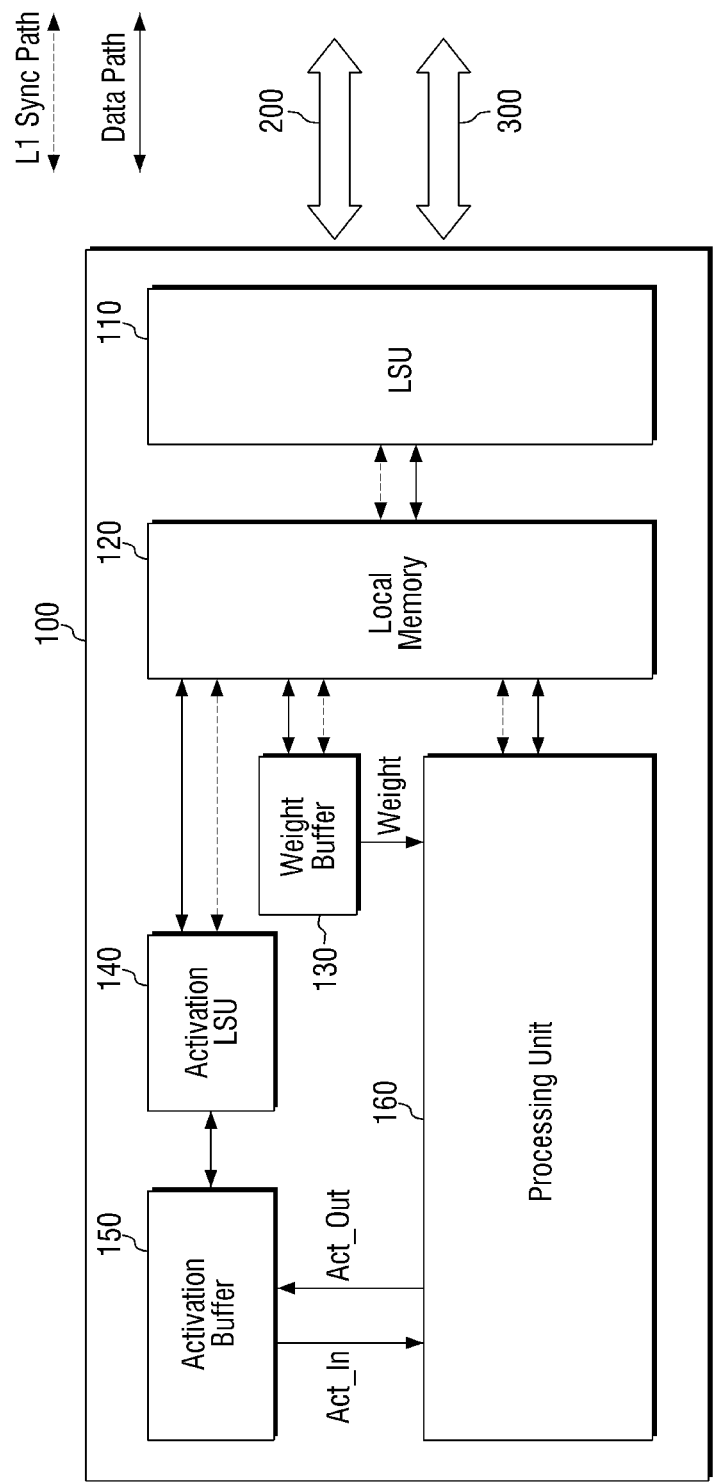
FIG. 6 is a block diagram for illustrating the neural core of FIG. 5.

FIG. 6 is a block diagram for illustrating the neural core of FIG. 5.

Referring to FIG. 6, each of the at least one neural core 100 may include a load/store unit (LSU) 110, a local memory 120, a weight buffer 130, an activation LSU 140, an activation buffer 150, and a processing unit 160.

The LSU 110 may receive at least one of data, a control signal, and a synchronization signal from the outside via the local interconnection 200 and the L2 sync path 300. The LSU 110 may transmit at least one of the data, the control signal, and the synchronization signal received to the local memory 120. Similarly, the LSU 110 may transfer at least one of the data, the control signal, and the synchronization signal to the outside via the local interconnection 200 and the L2 sync path 300.

Figure 7:
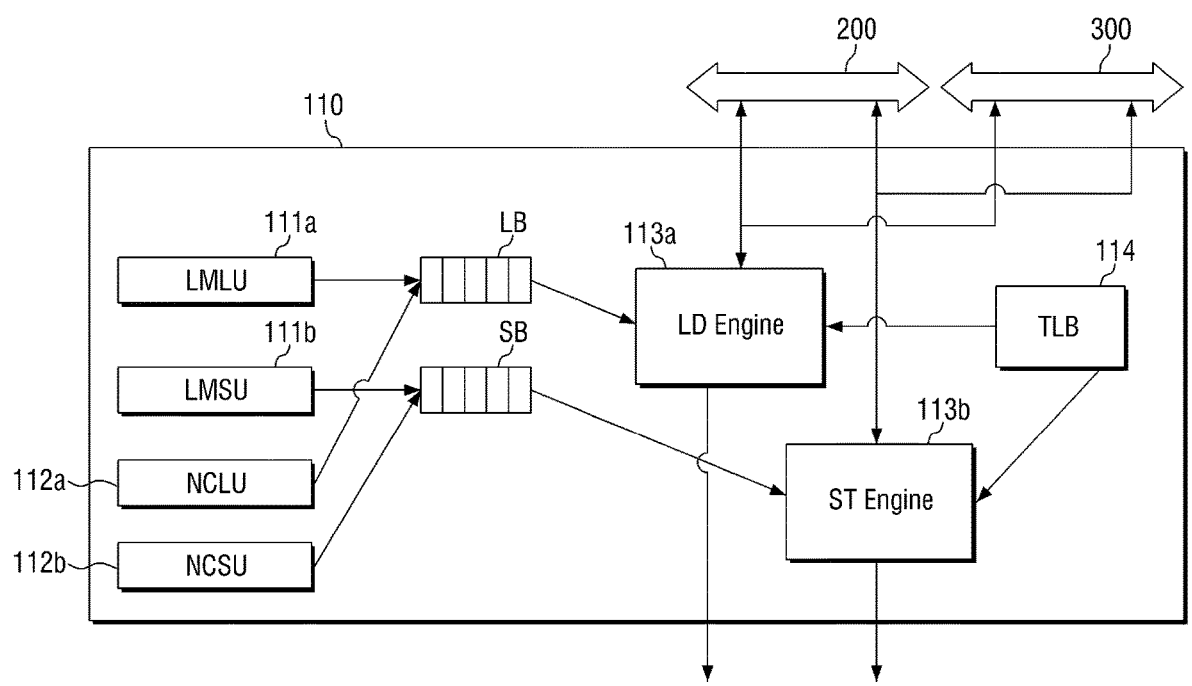
FIG. 7 is a block diagram for illustrating the LSU of FIG. 6.

FIG. 7 is a block diagram for illustrating the LSU of FIG. 6.

Referring to FIG. 7, the LSU 110 may include a local memory load unit (LMLU) 111a. a local memory store unit (LMSU) 111b, a neural core load unit (NCLU) 112a, a neural core store unit (NCSU) 112b, a load buffer LB, a store buffer SB, a load (LD) engine 113a, a store (ST) engine 113b, and a translation lookaside buffer (TLB) 114.

The local memory load unit 111a may fetch a load instruction for the local memory 120 and issue the load instruction. When the local memory load unit 111a provides the issued load instruction to the load buffer LB, the load buffer LB may sequentially transmit memory access requests to the load engine 113a according to the inputted order.

Further, the local memory store unit 111b may fetch a store instruction for the local memory 120 and issue the store instruction. When the local memory store unit 111b provides the issued store instruction to the store buffer SB, the store buffer SB may sequentially transmit memory access requests to the store engine 113b according to the inputted order.

The neural core load unit 112a may fetch a load instruction for the neural core 100 and issue the load instruction. When the neural core load unit 112a provides the issued load instruction to the load buffer LB, the load buffer LB may sequentially transmit memory access requests to the load engine 113a according to the inputted order.

In addition, the neural core store unit 112b may fetch a store instruction for the neural core 100 and issue the store instruction. When the neural core store unit 112b provides the issued store instruction to the store buffer SB, the store buffer SB may sequentially transmit memory access requests to the store engine 113b according to the inputted order.

The load engine 113a may receive the memory access request and retrieve data via the local interconnection 200. At this time, the load engine 113a may quickly find the data by using a translation table of a physical address and a virtual address that has been used recently in the translation lookaside buffer 114. If the virtual address of the load engine 113a is not in the translation lookaside buffer 114, the address translation information may be found in another memory.

The store engine 113b may receive the memory access request and retrieve data via the local interconnection 200. At this time, the store engine 113b may quickly find the data by using a translation table of a physical address and a virtual address that has been used recently in the translation lookaside buffer 114. If the virtual address of the store engine 113b is not in the translation lookaside buffer 114, the address translation information may be found in another memory.

The load engine 113a and the store engine 113b may send synchronization signals to the L2 sync path 300. At this time, the synchronization signal may indicate that the task has been completed.

Referring to FIG. 6 again, the local memory 120 is a memory located inside the neural core 100, and may receive all input data required for the tasks by the neural core 100 from the outside and store them temporarily. In addition, the local memory 120 may temporarily store the output data calculated by the neural core 100 for transmission to the outside. The local memory 120 may serve as a cache memory of the neural core 100.

The local memory 120 may transmit an input activation Act_In to the activation buffer 150 via the activation LSU 140 and receive an output activation Act_Out from the activation buffer 150 via the activation LSU 140. The local memory 120 may directly transmit and receive data to and from the processing unit 160 as well as the activation LSU 140. In other words, the local memory 120 may exchange data with each of a PE array and a vector unit as described below.

The local memory 120 may be a memory associated with the neural core level, i.e., level 1 (L1). Accordingly, the local memory 120 may also be represented as an L1 memory. The L1 memory may not be shared but be a private memory of the neural core, unlike the L2 shared memory 400 and the L3 shared memory, i.e., the shared memory 2000.

The local memory 120 may transmit data such as activations or weights via a data path. The local memory 120 may exchange synchronization signals via an L1 sync path, which is a separate dedicated path. The local memory 120 may exchange synchronization signals with, for example, the LSU 110, the weight buffer 130, the activation LSU 140, and the processing unit 160 via the L1 sync path.

The weight buffer 130 may receive a weight from the local memory 120. The weight buffer 130 may transfer the weight to the processing unit 160. The weight buffer 130 may temporarily store the weight before transferring it.

The input activation Act_In and the output activation Act_Out may refer to input values and output values of the layers of a neural network, respectively. In this case, if there are a plurality of layers in the neural network, the output value of the previous layer becomes the input value of the next layer, and thus, the output activation Act_Out of the previous layer may be utilized as the input activation Act_In of the next layer.

The weight may refer to a parameter that is multiplied by the input activation Act_In inputted in each layer. The weight may be updated in the deep learning training stage, and may be used to derive the output activation Act_Out via the updated value in the inference stage.

The activation LSU 140 may transfer the input activation Act_In from the local memory 120 to the activation buffer 150, and the output activation Act_Out from the activation buffer 150 to the on-chip buffer. In other words, the activation LSU 140 may perform both a load task and a store task of the activation.

The activation buffer 150 may provide the input activation Act_In to the processing unit 160 and receive the output activation Act_Out from the processing unit 160. The activation buffer 150 may temporarily store the input activation Act_In and the output activation Act_Out.

The activation buffer 150 may quickly provide the activation to the processing unit 160, in particular, the PE array, which has a large amount of calculation, and may quickly receive the activation, thereby increasing the calculation speed of the neural core 100.

The processing unit 160 may be a module that performs calculations. The processing unit 160 may perform not only one-dimensional calculations but also two-dimensional matrix calculations, i.e., convolution operations. The processing unit 160 may receive an input activation Act_In, multiply it by a weight, and then add it to generate an output activation Act_Out.

Figure 8:
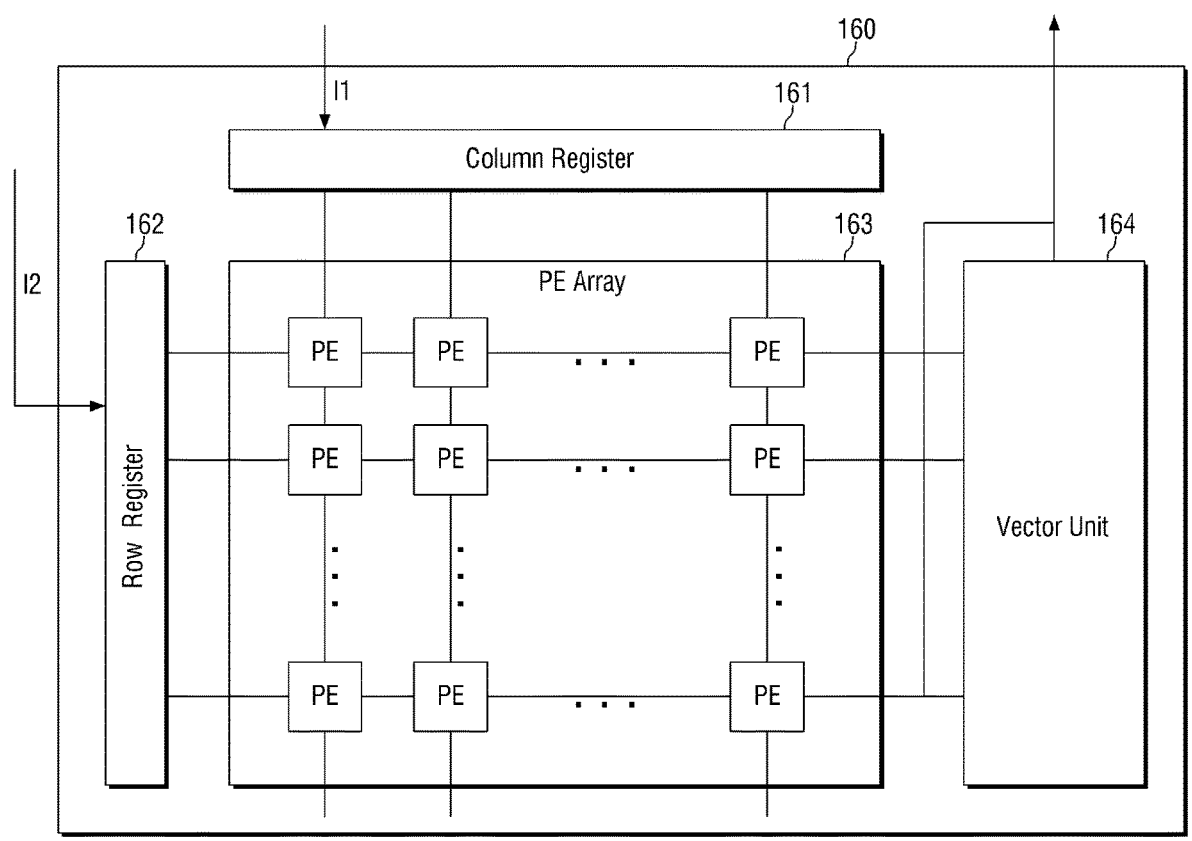
FIG. 8 is a block diagram for illustrating the processing unit of FIG. 6.

FIG. 8 is a block diagram for illustrating the processing unit of FIG. 6.

Referring to FIG. 6 and FIG. 8, the processing unit 160 may include a PE array 163, a vector unit 164, a column register 161, and a row register 162.

The PE array 163 may receive the input activation Act_In and the weight and perform multiplication on them. In this case, each of the input activation Act_In and the weight may be in the form of matrices and calculated via convolution. Through this, the PE array 163 may generate an output activation Act_Out. However, the embodiment is not limited thereto. The PE array 163 may generate any types of outputs other than the output activation Act_Out as well.

The PE array 163 may include at least one processing element PE. The processing elements PE may be aligned with each other so that each of the processing elements PE may perform multiplication on one input activation Act_In and one weight.

The PE array 163 may sum values for each multiplication to generate a subtotal. This subtotal may be utilized as an output activation Act_Out. The PE array 163 performs two-dimensional matrix multiplication, and thus, may be referred to as a 2D matrix compute unit.

The vector unit 164 may mainly perform one-dimensional calculations. The vector unit 164, together with the PE array 163, may perform deep learning calculations. Through this, the processing unit 160 may be specialized for necessary calculations. In other words, each of the at least one neural core 100 has calculation modules that perform a large amount of two-dimensional matrix multiplications and one-dimensional calculations, and thus, can efficiently perform deep learning tasks.

The column register 161 may receive a first input I1. The column register 161 may receive the first input I1, and distribute them to each column of the processing elements PE.

The row register 162 may receive a second input I2. The row register 162 may receive the second input I2, and distribute them to each row of the processing elements PE.

The first input I1 may be an input activation Act_In or a weight. The second input I2 may be a value other than the first input I1 between the input activation Act_In or the weight. Alternatively, the first input I1 and the second input I2 may be values other than the input activation Act_In and the weight.

Figure 9:
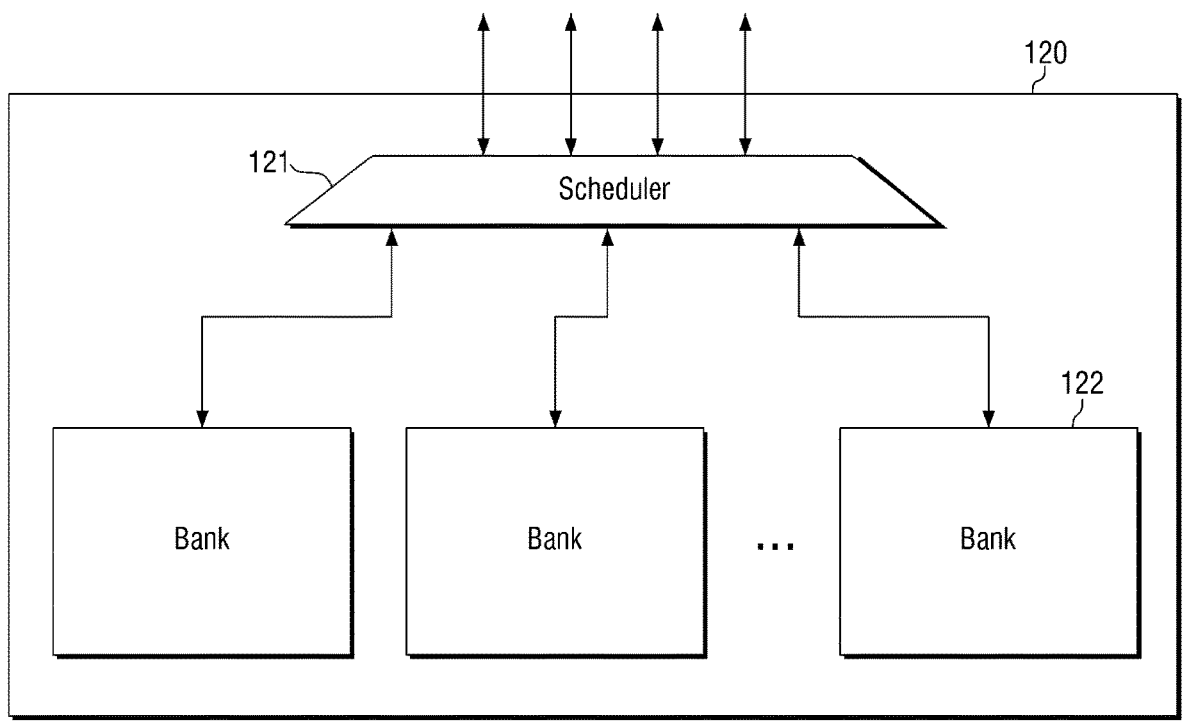
FIG. 9 is a block diagram for illustrating the local memory of FIG. 6.

FIG. 9 is a block diagram for illustrating the local memory of FIG. 6.

Referring to FIG. 9, the local memory 120 may include a scheduler 121 and at least one local memory bank 122.

When data is stored in the local memory 120, the scheduler 121 may receive the data from the load engine 113*a*. In this case, the at least one local memory bank 122 may be allocated to the data in a round robin. Accordingly, the data may be stored in any one of the at least one local memory bank 122.

Figure 10:
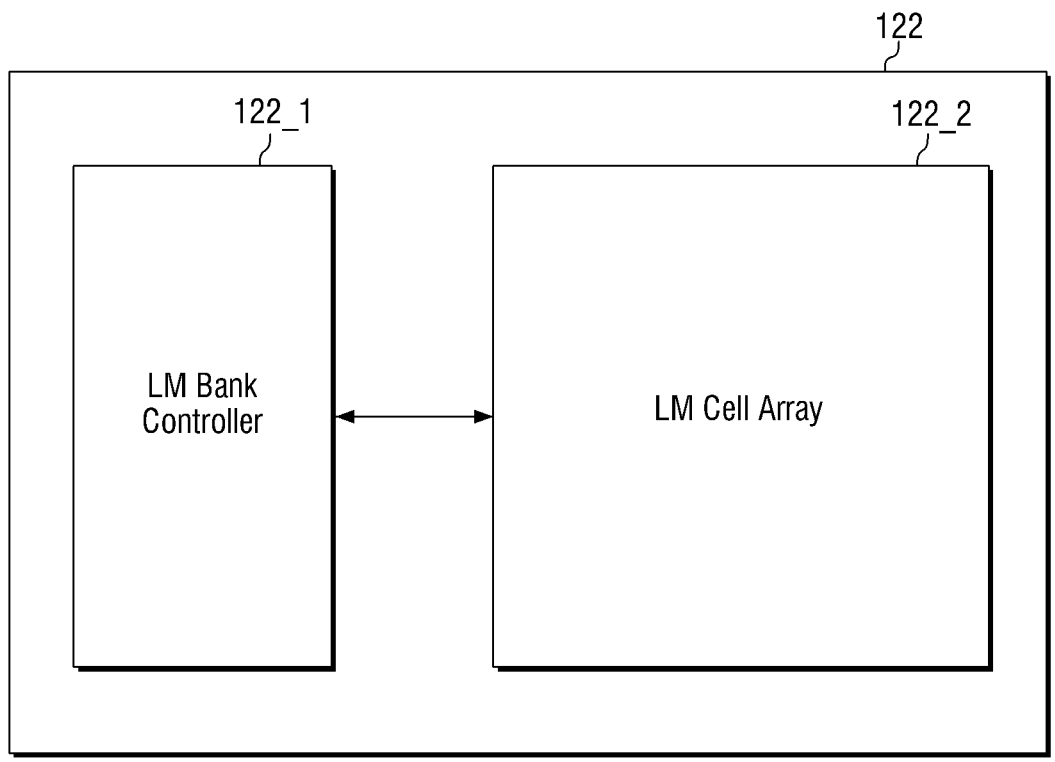
FIG. 10 is a block diagram for illustrating the local memory bank of FIG. 9.

Conversely, when the data is loaded from the local memory 120, the scheduler 121 may receive the data from the at least one local memory bank 122 and transfer them to the store engine 113*b*. The store engine 113*b* may store data externally via the local interconnection 200. FIG. 10 is a block diagram for illustrating the local memory bank of FIG. 9.

Referring to FIG. 10, the local memory bank 122 may include a local memory bank controller 122_1 and a local memory bank cell array 122_2.

The local memory bank controller 122_1 may manage read and write operations via the addresses of data stored in the local memory bank 122. In other words, the local memory bank controller 122_1 may manage the input/output of data as a whole.

The local memory bank cell array 122_2 may be of a structure in which cells in which data is directly stored are arranged in rows and columns. The local memory bank cell array 122_2 may be controlled by the local memory bank controller 122_1.

Figure 11:
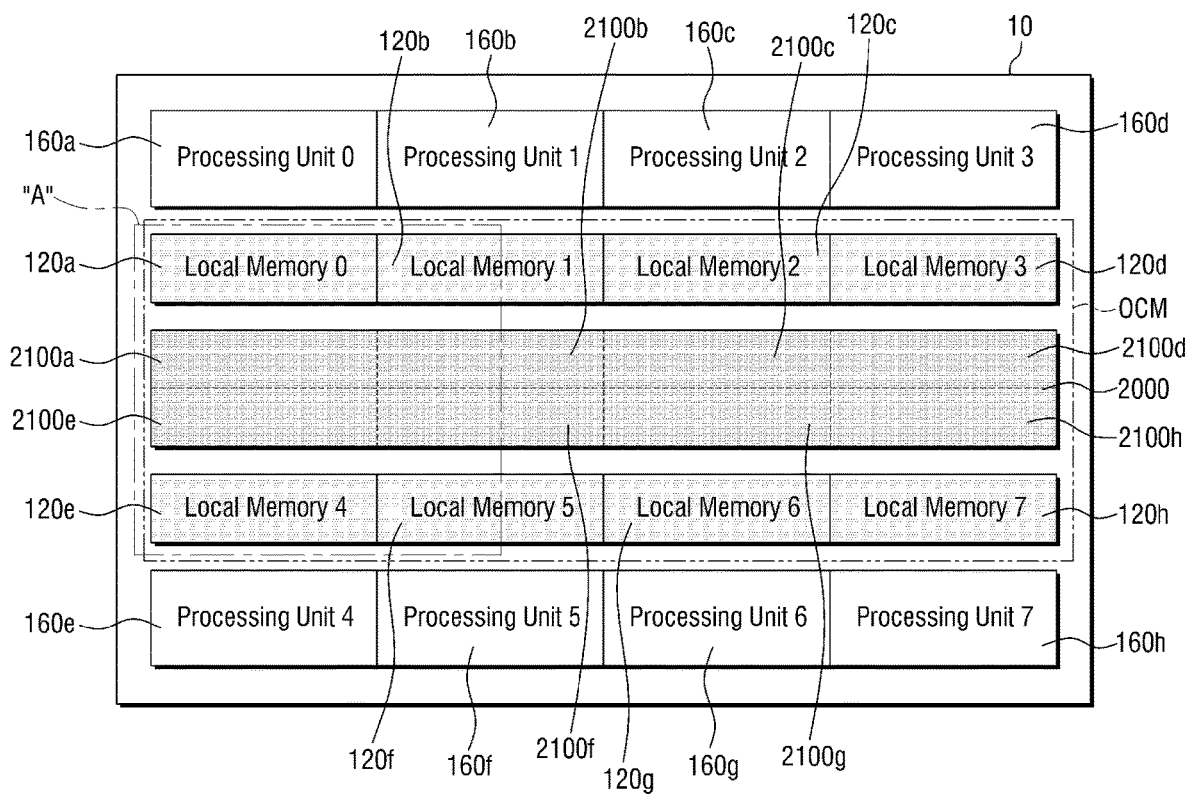
FIG. 11 is a block diagram for illustrating memory reconstruction of a neural processing system in accordance with some embodiments.

FIG. 11 is a block diagram for illustrating memory reconstruction of a neural processing system in accordance with some embodiments.

Referring to FIG. 11, the neural core SoC 10 may include first to eighth processing units 160*a* to 160*h* and an on-chip memory OCM. Although FIG. 11 illustrates eight processing units as an example, this is merely illustrative, and the number of processing units may vary as desired.

The on-chip memory OCM may include first to eighth local memories 120*a* to 120*h* and a shared memory 2000.

The first to eighth local memories 120*a* to 120*h* may be used as dedicated memories for the first to eighth processing units 160*a* to 160*h*, respectively. In other words, the first to eighth processing units 160*a* to 160*h* and the first to eighth local memories 120*a* to 120*h* may match 1:1 to each other.

The shared memory 2000 may include first to eighth memory units 2100*a* to 2100*h*. The first to eighth memory units 2100*a* to 2100*h* may correspond to the first to eighth processing units 160*a* to 160*h*, respectively, and may correspond to the first to eighth local memories 120*a* to 120*h*, respectively. That is, the number of memory units may be eight, which is the same as the number of processing units and is the same as the number of local memories.

The shared memory 2000 may operate in either one of two on-chip memory types. In other words, the shared memory 2000 may operate in one of a local memory type or a global memory type. That is, the shared memory 2000 may implement two types of logical memories with one piece of hardware.

If the shared memory 2000 is implemented in the local memory type, the shared memory 2000 may operate as a private memory for each of the first to eighth processing units 160*a* to 160*h*, just like the first to eighth local memories 120*a* to 120*h*. The local memory can operate at a relatively higher clock speed compared with the global memory, and the shared memory 2000 may also use a relatively higher clock speed when operating in the local memory type.

If the shared memory 2000 is implemented in the global memory type, the shared memory 2000 may operate as a common memory used by the first processing unit 160*a* and the second processing unit 160*b* together. In this case, the shared memory 2000 may be shared not only by the first to eighth processing units 160*a* to 160*h* but also by the first to eighth local memories 120*a* to 120*h*.

The global memory may generally use a lower clock compared with the local memory, but is not limited thereto. When the shared memory 2000 operates in the global memory type, the first to eighth processing units 160*a* to 160*h* may share the shared memory 2000. In this case, the shared memory 2000 may be connected to the volatile memory 32 of FIG. 2 via the global interconnection 6000 and may also operate as a buffer for the volatile memory 32.

At least a part of the shared memory 2000 may operate in the local memory type, and the rest may operate in the global memory type. In other words, the entire shared memory 2000 may operate in the local memory type, or the entire shared memory 2000 may operate in the global memory type. Alternatively, a part of the shared memory 2000 may operate in the local memory type, and the rest may operate in the global memory type.

Figure 12:
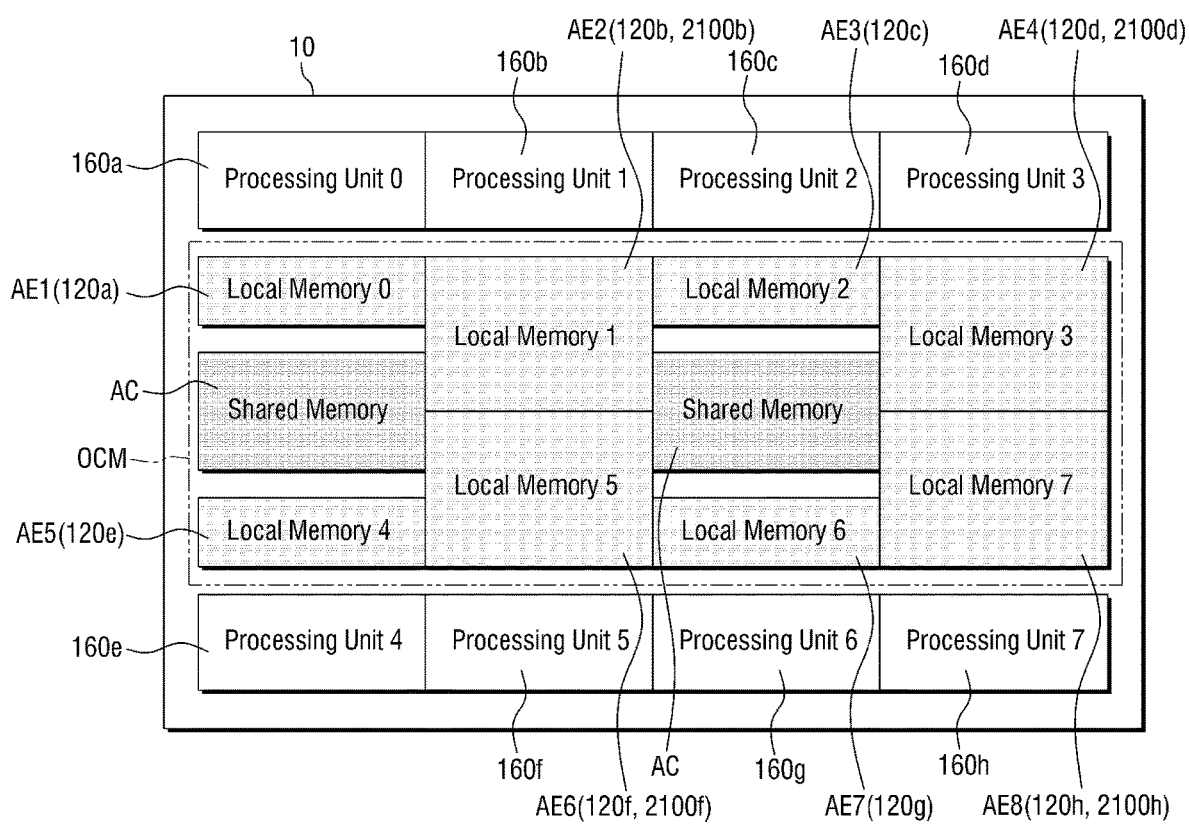
FIG. 12 is a block diagram showing an example of memory reconstruction of a neural processing system in accordance with some embodiments.

FIG. 12 is a block diagram showing an example of memory reconstruction of a neural processing system in accordance with some embodiments.

Referring to FIGS. 11 and 12, first, third, fifth, and seventh dedicated areas AE1, AE3, AE5, and AE7 associated respectively with the first, third, fifth, and seventh processing units 160a, 160c, 160e, and 160g may include only the first, third, fifth, and seventh local memories 120a, 120c, 120e, and 120g, respectively. Further, second, fourth, sixth, and eighth dedicated areas AE2, AE4, AE6, and AE8 associated respectively with the second, fourth, sixth, and eighth processing units 160b, 160d, 160f, and 160h may include second, fourth, sixth, and eighth local memories 120b, 120d, 120f, and 120h, respectively. In addition, the second, fourth, sixth, and eighth dedicated areas AE2, AE4, AE6, and AE8 may include the second, fourth, sixth, and eighth memory units 2100b, 2100d, 2100f, and 2100h. The first, third, fifth, and seventh memory units 2100a, 2100c, 2100e, and 2100g of the shared memory 2000 may be used as a common area AC.

The common area AC may be a memory shared by the first to eighth processing units 160a to 160h. The second dedicated area AE2 may include a second local memory 120b and a second memory unit 2100b. The second dedicated area AE2 may be an area in which the second local memory 120b and the second memory unit 210b that are separated hardware-wise operate in the same manner and operate logically as one local memory. The fourth, sixth, and eighth dedicated areas AE4, AE6, and AE8 may also operate in the same manner, respectively, as the second dedicated area AE2.

The shared memory 2000 in accordance with the embodiment may convert an area corresponding to each neural core into a logical local memory and a logical global memory at an optimized ratio and may use them. The shared memory 2000 may perform the adjustment of this ratio at runtime.

In other words, each processing unit may perform the same task in some cases, but may perform different tasks in other cases as well. In this case, the amount of the local memory and the amount of the global memory required for the tasks carried out by each processing unit are inevitably different each time. Accordingly, if the composition ratio of the local memory and the shared memory is fixedly set as in the conventional on-chip memory, there may occur inefficiency due to the calculation tasks assigned to each processing unit.

Figure 13:
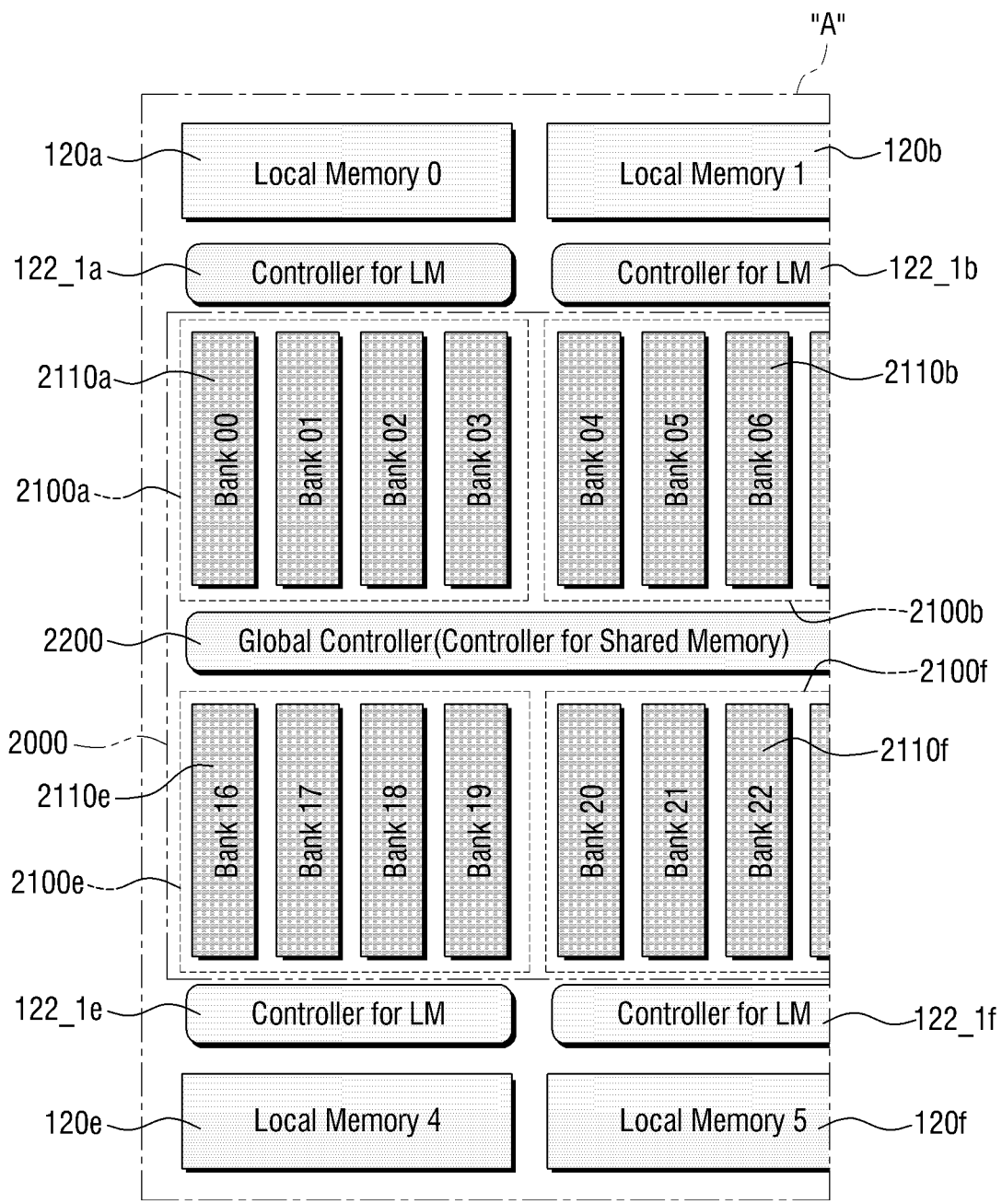
FIG. 13 is an enlarged block diagram of a portion A of FIG. 11.

Therefore, the shared memory 2000 of the neural processing device in accordance with the embodiment may set an optimal ratio of the local memory and the global memory according to calculation tasks during the runtime, and may improve the efficiency and speed of calculation. FIG. 13 is an enlarged block diagram of a portion A of FIG. 11.

Referring to FIGS. 11 and 13, the shared memory 2000 may include a first local memory controller 122_1a, a second local memory controller 122_1b, a fifth local memory controller 122_1e, a sixth local memory controller 122_1f, the first to eighth memory units 2100a to 2100h, and a global controller 2200. Other local memory controllers not shown may also be included in the embodiment, but the description thereof will be omitted for convenience.

The first local memory controller 122_1a may control the first local memory 120a. In addition, the first local memory controller 122_1a may control the first memory unit 2100a. Specifically, when the first memory unit 2100a is implemented in a logical local memory type, the first local memory controller 122_1a may control the first memory unit 2100a.

The second local memory controller 122_1b may control the second local memory 120b. Further, the second local memory controller 122_1b may control the second memory unit 2100b. In other words, when the second memory unit 2100b is implemented in the logical local memory type, the first local memory controller 122_1a may control the second memory unit 2100b.

The fifth local memory controller 122_1e may control the fifth local memory 120e. Further, the fifth local memory controller 122_1e may control the fifth memory unit 2100e. In other words, when the fifth memory unit 2100e is implemented in the logical local memory type, the fifth local memory controller 122_1e may control the fifth memory unit 2100e.

The sixth local memory controller 122_1f may control the sixth local memory 120f. Further, the sixth local memory controller 122_1f may control the sixth memory unit 2100f. In other words, when the sixth memory unit 2100f is implemented in the logical local memory type, the sixth local memory controller 122_1f may control the sixth memory unit 2100f.

The global controller 2200 may control all of the first to eighth memory units 2100a to 2100h. Specifically, the global controller 2200 may control, among the first to eighth memory unit 2100a to 2100h, memory units logically operating in the global memory type (i.e., when they do not operate logically in the local memory type).

In other words, the first to eighth memory units 2100a to 2100h may be controlled by the first to eighth local memory controllers 122_1a to 122_1h, respectively, or may be controlled by the global controller 2200, depending on what type of memory they are logically implemented in.

If the local memory controllers including the first, second, fifth, and sixth local memory controllers 122_1a. 122_1b, 122_1e, and 122_1f control the first to eighth memory units 2100a to 2100h, respectively, the local memory controllers control the first to eighth memory units 2100a to 2100h in the same manner as the first to eighth local memories 120a to 120h, and thus, can control them as the dedicated memory of the first to eighth processing units 160a to 160h. In some embodiments, if the i-th local memory controller controls the i-th memory unit, the i-th local memory controller controls the i-th memory unit in the same manner as it controls the i-th local memory, and thus, can control the i-th memory unit as the dedicated memory of the i-th processing unit. Accordingly, the first to eighth memory units 2100a to 2100h may operate at clock frequencies corresponding to the clock frequencies of the first to eighth processing units 160a to 160h, respectively.

Each of the local memory controllers including the first local memory controller 122_1a. the second local memory controller 122_1b, the fifth local memory controller 122_1e, and the sixth local memory controller 122_1f may include the LSU 110 of FIG. 6.

If the global controller 2200 controls at least one of the first to eighth memory units 2100a to 2100h, respectively, then the global controller 2200 may control the first to eighth memory units 2100a to 2100h as the global memory of the first to eighth processing units 160a to 160h, respectively. Accordingly, at least one of the first to eighth memory units 2100a to 2100h may operate at a clock frequency independent of the clock frequencies of the first to eighth processing units 160a to 160h, respectively. In some embodiments, if the global controller 2200 controls the i-th memory unit among the first to eighth memory units 2100a to 2100h, the global controller 2200 may control the i-th memory unit as the global memory of the i-th processing unit, and the i-th memory unit may operate at a clock frequency independent of the clock frequency of the i-th processing unit. However, the embodiment is not limited thereto.

The global controller 2200 may connect the first to eighth memory units 2100a to 2100h with the global interconnection 6000 of FIG. 3. The first to eighth memory units 2100a to 2100h may exchange data with the off-chip memory 30 of FIG. 2 or may exchange data with the first to eighth local memories 120a to 120h, respectively, by means of the global controller 2200.

Each of the first to eighth memory units 2100a to 2100h may include at least one memory bank. The first memory unit 2100a may include at least one first memory bank 2110a. The first memory banks 2110a may be areas obtained by dividing the first memory unit 2100a into certain sizes. The first memory banks 2110a may all be memory devices of the same size. However, the embodiment is not limited thereto. FIG. 13 illustrates that four memory banks are included in one memory unit.

Similarly, the second, fifth, and sixth memory units 2100b, 2100e, and 2100f may include at least one second, fifth, and sixth memory banks 2110b, 2110e, and 2110f, respectively.

In the following, the description will be made based on the first memory banks 2110a and the fifth memory banks 2110e, which may be the same as other memory banks including the second and sixth memory banks 2110b and 2110f.

Each the first memory banks 2110a may operate logically in the local memory type or operate logically in the global memory type. In this case, the first memory banks 2110a may operate independently of the other memory banks in the first memory unit 2100a. However, the embodiment is not limited thereto.

If each memory bank operates independently, the first memory unit 2100a may include a first area operating in the same manner as the first local memory 120a and a second area operating in a different manner from the first local memory 120a. In this case, the first area and the second area do not necessarily coexist, but any one area may occupy the entire first memory unit 2100a.

Likewise, the second memory unit 2100b may include a third area operating in the same manner as the second local memory 120b and a fourth area operating in a different manner from the second local memory 120b. In this case, the third area and the fourth area do not necessarily coexist, and any one area may occupy the entire first memory unit 2100a.

In this case, the ratio of the first area to the second area may be different from the ratio of the third area to the fourth area. However, the embodiment is not limited thereto. Therefore, the ratio of the first area to the second area may be the same as the ratio of the third area to the fourth area. In other words, the memory composition ratio in each memory unit may vary as desired.

In general, in the case of the conventional system on a chip, the on-chip memory except for high-speed local memory was often composed of high-density, low-power SRAM. This is because SRAM has high efficiency in terms of chip area and power consumption relative to required capacity. However, with the conventional on-chip memory, the processing speed slowed down significantly inevitably in the case of tasks that require more data quickly than the predetermined capacity of the local memory. Even when the need for the global memory is not high, there is no way to utilize the remaining global memory, resulting in inefficiency.

On the other hand, the shared memory 2000 in accordance with some embodiments may be controlled selectively by any one of the two controllers depending on the cases. In this case, the shared memory 2000 may be controlled not only as a whole by a determined one of the two controllers but also independently for each memory unit or each memory bank.

Therefore, the shared memory 2000 in accordance with the embodiment may obtain an optimal memory composition ratio for calculation tasks during the runtime to perform faster and more efficient calculation tasks. In the case of a processing unit specialized in artificial intelligence, the required sizes of local memory and global memory may vary for each particular application. Moreover, even for the same application, the required sizes of local memory and global memory may vary for each layer when a deep learning network is used. In the shared memory 2000 in accordance with the embodiment, the composition ratio of the memory can be changed during the runtime even when calculation steps change for each layer, making fast and efficient deep learning tasks possible.

Figure 14:
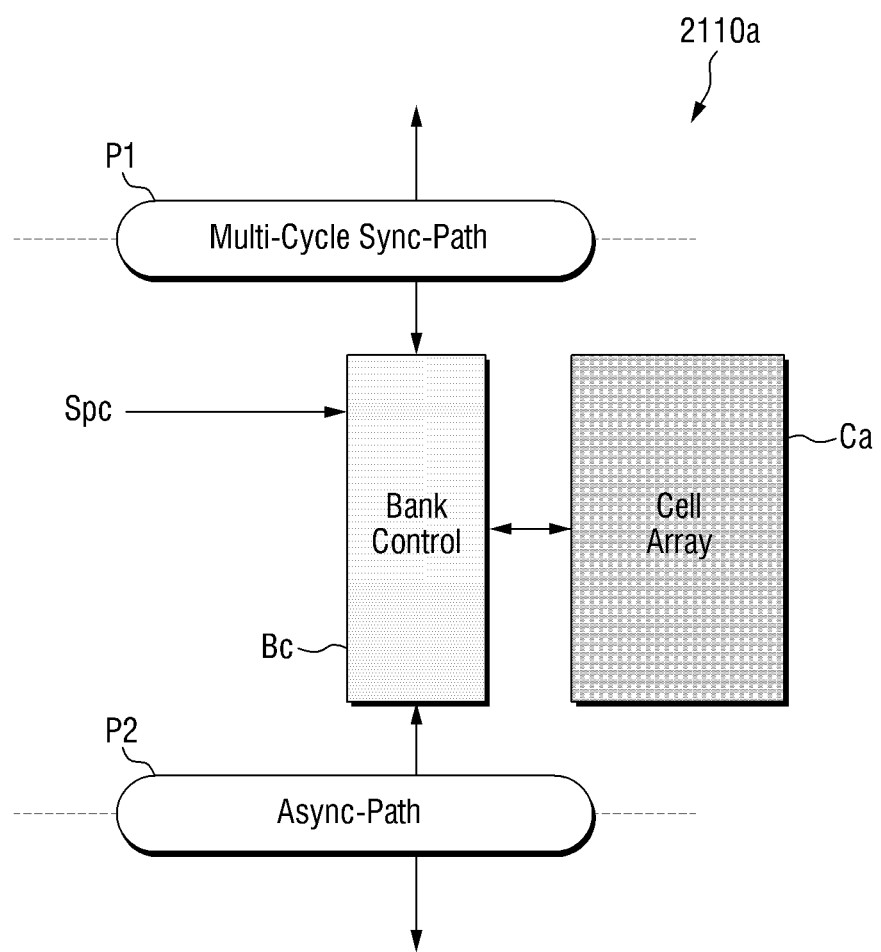
FIG. 14 is a diagram for illustrating the first bank of FIG. 13.

FIG. 14 is a diagram for illustrating the first bank of FIG. 13. Although FIG. 14 illustrates the first memory bank 2110a, other memory banks may also have the same structure as the first memory bank 2110a.

Referring to FIG. 14, the first memory bank 2110a may include a cell array Ca, a bank controller Bc, a first path unit P1, and a second path unit P2.

The cell array Ca may include a plurality of memory devices (cells) therein. In the cell array Ca, the plurality of memory devices may be arranged in a lattice structure. The cell array Ca may be, for example, a SRAM (static random-access memory) cell array.

The bank controller Bc may control the cell array Ca. The bank controller Bc may determine whether the cell array Ca operates in the local memory type or in the global memory type, and may control the cell array Ca according to the determined memory type.

Specifically, the bank controller Bc may determine whether to transmit and receive data in the direction of the first path unit P1 or to transmit and receive data in the direction of the second path unit P2 during the runtime. The bank controller Bc may determine a data transmission and reception direction according to a path control signal Spc.

The path control signal Spc may be generated by a pre-designed device driver or compiler. The path control signal Spc may be generated according to the characteristics of calculation tasks. Alternatively, the path control signal Spc may be generated by an input received from a user. In other words, the user may directly apply an input to the path control signal Spc in order to select optimal memory composition ratio.

The bank controller Bc may determine a path along which the data stored in the cell array Ca are transmitted and received via the path control signal Spc. The exchange interface of data may be changed as the bank controller Bc determines the path along which the data are transmitted and received. In other words, a first interface may be used when the bank controller Bc exchanges data with the first path unit P1, and a second interface may be used when the bank controller Bc exchanges data with the second path unit P2. In this case, the first interface and the second interface may be different from each other.

Also, address systems in which data are stored may vary as well. In other words, if a particular interface is selected, then read and write operations may be performed in an address system corresponding thereto.

The bank controller Bc may operate at a particular clock frequency. For example, if the cell array Ca is an SRAM cell array, the bank controller Bc may operate at the operating clock frequency of a general SRAM.

The first path unit P1 may be connected to the bank controller Bc. The first path unit P1 may directly exchange the data of the cell array Ca with the first processing unit 160a. In this case, "directly" may mean being exchanged with each other without going through the global interconnection 6000. In other words, the first processing unit 160a may exchange data directly with the first local memory 120a, and the first processing unit 160a may exchange data via the first path unit P1 when the shared memory 2000 is implemented logically in the local memory type. The first path unit P1 may include local memory controllers including the first local memory controller 122_1a and the second local memory controller 122_1b as shown in FIG. 13.

The first path unit P1 may form a multi-cycle sync-path. In other words, the operating clock frequency of the first path unit P1 may be the same as the operating clock frequency of the first processing unit 160a. The first local memory 120a may quickly exchange data at the same clock frequency as the operating clock frequency of the first processing unit 160a in order to quickly exchange data at the same speed as the operation of the first processing unit 160a. Likewise, the first path unit P1 may also operate at the same clock frequency as the operating clock frequency of the first processing unit 160a.

In this case, the operating clock frequency of the first path unit P1 may be multiples of the operating clock frequency of the bank controller Bc. In this case, a clock domain crossing (CDC) operation for synchronizing the clocks between the bank controller Be and the first path unit P1 is not needed separately, and thus, a delay of data transmission may not occur. Accordingly, faster and more efficient data exchange can be possible.

In FIG. 14, the operating clock frequency of the first path unit P1 may be 1.5 GHZ, as an example. This may be twice the frequency of 750 MHZ of the bank controller Bc. However, the embodiment is not limited thereto, and any may be possible as long as the first path unit P1 operates at integer multiples of the clock frequency of the bank controller Bc.

The second path unit P2 may be connected to the bank controller Bc. The second path unit P2 may exchange the data of the cell array Ca with the first processing unit 160a not directly but via the global interconnection 6000. In other words, the first processing unit 160a may exchange data with the cell array Ca via the global interconnection 6000 and the second path unit P2. In this case, the cell array Ca may exchange data not only with the first processing unit 160a but also with other processing units.

In other words, the second path unit P2 may be a data exchange path between the cell array Ca and all the processing units when the first memory bank 2110a is implemented logically in the global memory type. The second path unit P2 may include the global controller 2200 of FIG. 13.

The second path unit P2 may form an Async-Path. The operating clock frequency of the second path unit P2 may be the same as the operating clock frequency of the global interconnection 6000. Likewise, the second path unit P2 may also operate at the same clock frequency as the operating clock frequency of the global interconnection 6000.

In this case, the operating clock frequency of the second path unit P2 may not be synchronized with the operating clock frequency of the bank controller Bc. In this case, the clock domain crossing (CDC) operation for synchronizing the clocks between the bank controller Bc and the second path unit P2 may be required. If the operating clock frequency of the bank controller Bc and the operating clock frequency of the second path unit P2 are not synchronized with each other, the degree of freedom in the design of the clock domain may be relatively high. Therefore, the difficulty of hardware design is decreased, thereby making it possible to derive the hardware operation more easily.

The bank controller Be may use different address systems in the case of exchanging data via the first path unit P1 and in the case of exchanging data via the second path unit P2. In other words, the bank controller Bc may use a first address system if via the first path unit P1 and a second address system if via the second path unit P2. In this case, the first address system and the second address system may be different from each other.

The bank controller Be does not necessarily have to exist for each memory bank. In other words, the bank controller Be is not a part for scheduling but serves to transfer signals, and thus, is not an essential part for each memory bank having two ports. Therefore, one bank controller Bc can control multiple memory banks. The multiple memory banks may operate independently even if they are controlled by the bank controller Bc. However, the embodiment is not limited thereto.

As a matter of course, the bank controller Be may exist for each memory bank. In this case, the bank controller Bc may control each memory bank individually.

Referring to FIG. 13 and FIG. 14, if the first memory unit 2100a exchanges data via the first path unit P1, the first address system may be used. If the first memory unit 2100a exchanges data via the second path unit P2, the second address system may be used. Similarly, if the second memory unit 2100b exchanges data via the first path unit P1, a third address system may be used. If the second memory unit 2100b exchanges data via the second path unit P2, the second address system may be used. In this case, the first address system and the third address system may be the same as each other. However, the embodiment is not limited thereto.

The first address system and the third address system may each be used exclusively for the first processing unit 160a and the second processing unit 160b, respectively. The second address system may be commonly applied to the first processing unit 160a and the second processing unit 160b.

In FIG. 14, the operating clock frequency of the second path unit P2 may operate at 1 GHz, as an example. This may be a frequency that is not synchronized with the operating clock frequency of 750 MHz of the bank controller Bc. In other words, the operating clock frequency of the second path unit P2 may be freely set without being dependent on the operating clock frequency of the bank controller Bc at all.

A generic global memory has used slow SRAM (e.g., 750 MHZ) and a global interconnection (e.g., 1 GHZ) faster than that, inevitably resulting in delays due to the CDC operation. On the other hand, the shared memory 2000 in accordance with some embodiments has room to use the first path unit P1 in addition to the second path unit P2, thereby making it possible to avoid delays resulting from the CDC operation.

Furthermore, in the generic global memory, a plurality of processing units use one global interconnection 6000, and thus, when the amount of data transfer occurs at the same time, the decrease in the overall processing speed is likely to occur. On the other hand, the shared memory 2000 in accordance with some embodiments has room to use the first path unit P1 in addition to the second path unit P2, thereby making it possible to achieve the effect of properly distributing the data throughput that could be concentrated on the global controller 2200 as well.

Figure 15:
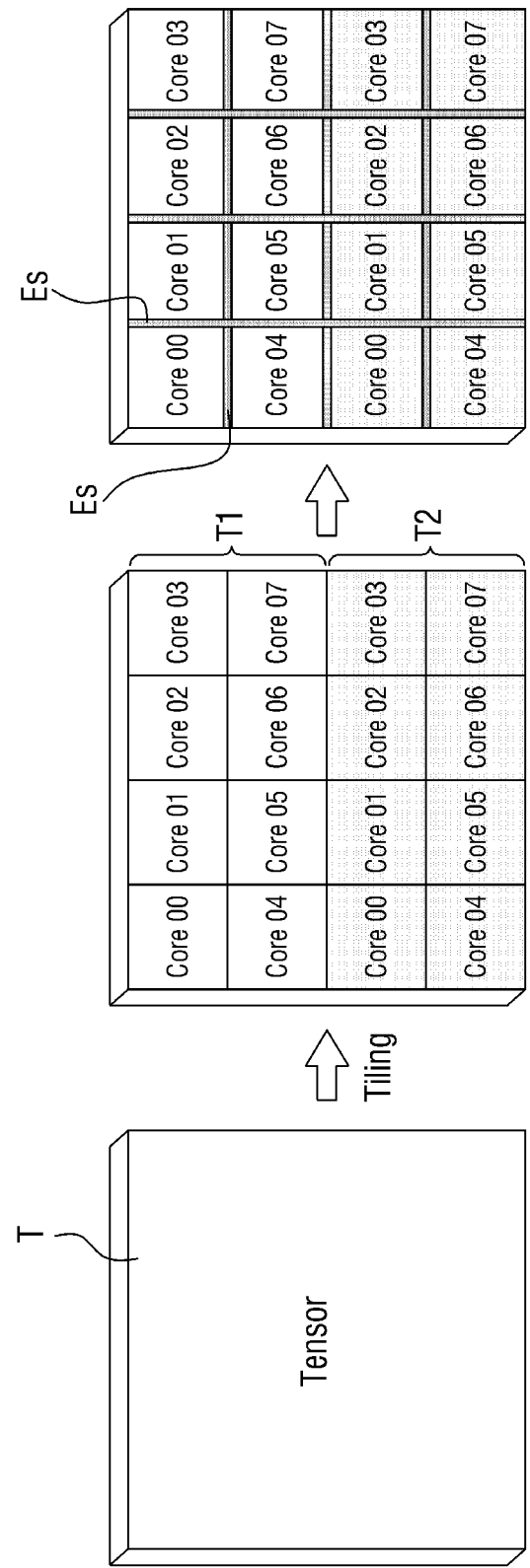
FIG. 15 is a conceptual diagram for illustrating task assignment according to a tensor tiling method of a neural processing device in accordance with some embodiments of the disclosure.

FIG. 15 is a conceptual diagram for illustrating task assignment according to a tensor tiling method of a neural processing device in accordance with some embodiments of the disclosure.

Referring to FIG. 15, a task of a neural processing device in accordance with some embodiments of the disclosure may be represented by a multidimensional tensor T. In general, deep learning tasks may exist in the form of a tensor in some cases. Such a tensor may be tiled by software. Tiling may refer to the task of dividing a tensor in order to distribute the tensor to each neural core in a neural processing device having multiple cores.

Although FIG. 15 illustrates a total of eight neural cores, the embodiment is not limited thereto. That is, the number of neural cores in accordance with some embodiments of the disclosure may be seven or fewer, or nine or more.

When tiling the tensor, the amount of task that the neural core may be first distributed to the neural cores at T1, and subsequently the same amount of task may be redistributed to the neural cores at T2. In other words, each neural core executes in parallel, but if the amount of the task is large, the task unit that has been processed in parallel may be repeated in series again.

In this case, boundary tasks Es shown as the form of a stick may exist between the tasks of the respective neural cores. The boundary task Es may be a kind of synchronization task that can enable the respective neural cores to share the task results with each other and to subsequently execute the task. In other words, if a plurality of neural cores distributes and performs the same task, synchronization according to the dependency is required, and thus, these parts can be represented as boundary tasks Es.

The amount of such boundary tasks Es may vary depending on the type of tasks, the number of neural cores, and the type of tiling, but the size of such boundary tasks Es may be approximately 2 KB to 4 KB. However, the embodiment is not limited thereto.

If the number of neural cores is not large, the burden of these boundary tasks Es may not be considerable. However, if the amount of tasks increases and the number of neural cores increases, the overhead of these boundary tasks Es may be at a level that cannot be neglected.

Figure 16:
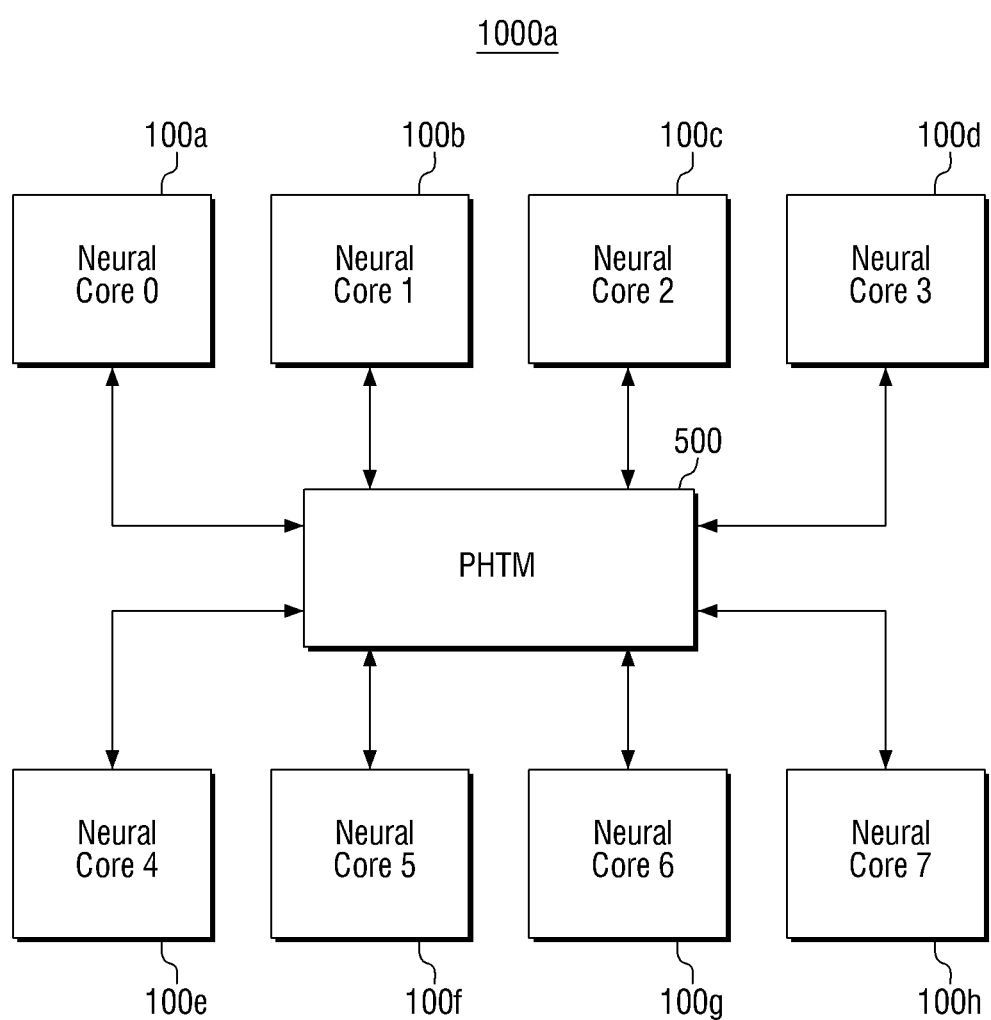
FIG. 16 is a block diagram for illustrating the operation of a neural core and a PHTM of a neural processing device in accordance with some embodiments of the disclosure.

FIG. 16 is a block diagram for illustrating the operation of a neural core and a PHTM of a neural processing device in accordance with some embodiments of the disclosure.

Referring to FIG. 16, a first neural processor 1000a of a neural processing device in accordance with some embodiments of the disclosure may include first to eighth neural cores 100a to 100h and a PHTM 500.

The first to eighth neural cores 100a to 100h may each provide a memory access request to the PHTM 500. In this case, the memory access request may include a read request and a write request.

The read request may be a request to read data from a shared memory or local memory, and the write request may be a request to write data onto the shared memory or local memory.

The PHTM 500 may receive memory access requests from all of the first to eighth neural cores 100a to 100h, and track read operations and write operations based on preset criteria. Accordingly, the first to eighth neural cores 100a to 100h may continue to perform tasks without the need to send and receive synchronization signals between the respective neural cores, and accordingly, the efficiency of the entire device can be greatly improved.

Figure 17:
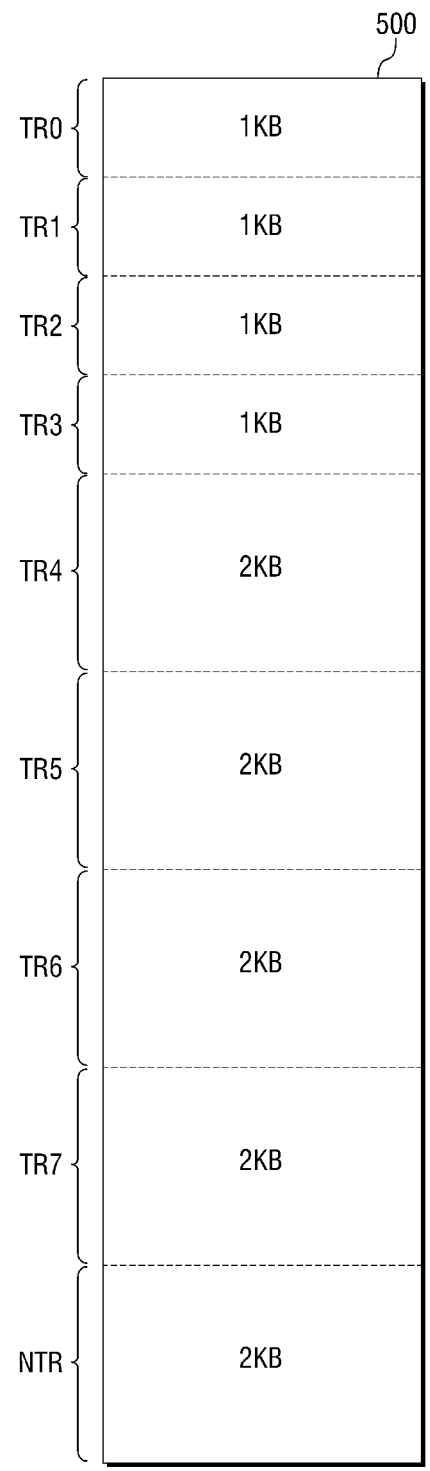
FIG. 17 is a diagram for illustrating in detail the internal structure of the PHTM of FIG. 16.
Figure 18:
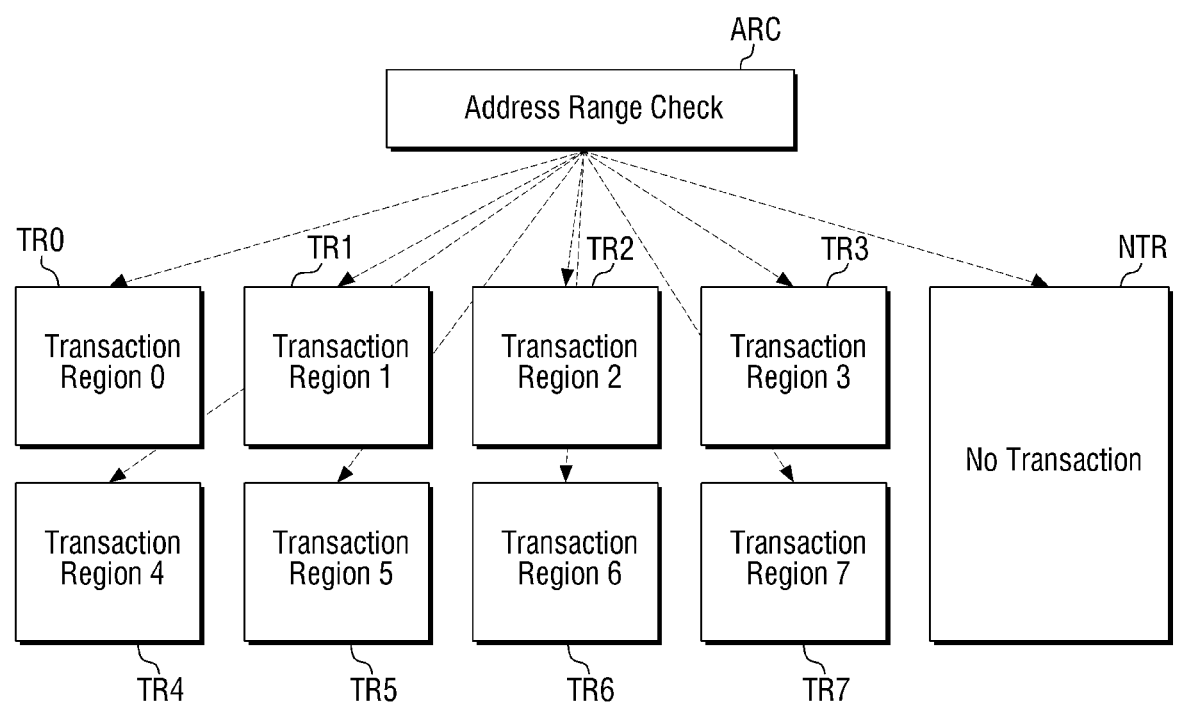
FIG. 18 is a block diagram for illustrating the structure and operating method of the PHTM of FIG. 16.

FIG. 17 is a diagram for illustrating in detail the internal structure of the PHTM of FIG. 16, and FIG. 18 is a block diagram for illustrating the structure and operating method of the PHTM of FIG. 16.

Referring to FIGS. 17 and 18, the PHTM 500 may include at least one transaction region TR0 to TR7 and a non-transaction region NTR. However, the embodiment is not limited thereto. In other words, the PHTM 500 may not include any non-transaction region NTR.

Although FIGS. 17 and 18 illustratively show the first to eighth transaction regions TR0 to TR7, i.e., eight transaction regions, the embodiment is not limited thereto. That is, the number of transaction regions may be seven or fewer, or nine or more. In this case, the number of transaction regions may be defined by hardware. In other words, the number of transaction regions to be used may be fixed in the device design stage.

The sizes of the first to eighth transaction regions TR0 to TR7 may be set by software. Each of the first to eighth transaction regions TR0 to TR7 may be an area consisting of consecutive physical addresses. In other words, the first to eighth transaction regions TR0 to TR7 may not be physically distinguished areas, but may be logically programmed areas. However, as described above, the total number of transaction regions may be fixed in advance.

The sizes of the first to eighth transaction regions TR0 to TR7 may be different from each other. In other words, depending on the needs and purposes, the sizes of the first to eighth transaction regions TR0 to TR7 may be all the same, all different from one another, or can also be set to be the same among some transaction regions.

In addition, the PHTM 500 may include an address range checker ARC. The address range checker ARC may allocate the memory access requests received by the PHTM 500 to the first to eighth transaction regions TR0 to TR7 and the non-transaction region NTR.

The first to eighth transaction regions TR0 to TR7 may track transactions (read and write operations) by each transaction region. In contrast, the non-transaction region NTR may not track transactions. Such the PHTM 500 may include or may not include the non-transaction region NTR depending on the size setting of the first to eighth transaction regions TR0 to TR7.

Figure 19:
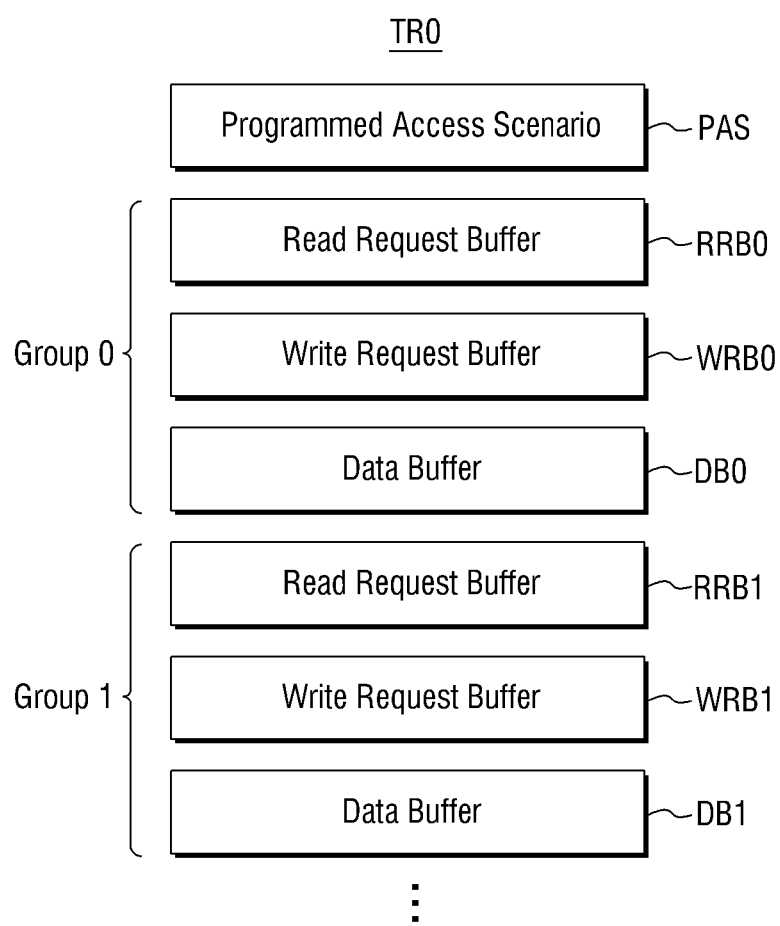
FIG. 19 is a block diagram for illustrating in detail the first transaction region of FIG. 18.

FIG. 19 is a block diagram for illustrating in detail the first transaction region of FIG. 18.

Referring to FIG. 19, the first transaction region TR0 may include a programmed access scenario area PAS, a first group area Group 0, and a second group area Group 1. Although only two group areas of a first group area Group 0 and a second group area Group 1 are illustrated in FIG. 19, the embodiment is not limited thereto. That is, the number of group areas may be one or three or more.

The programmed access scenario area PAS may receive and record PAS information including memory access scenario for a plurality of memory access operation groups. The PAS information may include a plurality of information fields, each of the plurality of information fields associated with a plurality of memory access operation groups to be serviced in the given order. Each of the plurality of information fields may include a group number belonging to the associated memory access operation group, a memory access type belonging to the associated memory access operation group, and a number of memory accesses required for the associated memory access operation group. In some embodiments, the group number may indicate, but not limited to, 0 or 1, the memory access type may indicate, but not limited to, write or read, and the number of memory accesses may be a positive integer. In some embodiments, the plurality of memory access operation groups may be arranged in order of service order. In some embodiments, each PAS information field may include service order information subfield indicating the service order of an associated memory access operation group.

The first group area Group 0 may include a first read request buffer RRB0, a first write request buffer WRB0, and a first data buffer DB0.

The first read request buffer RRB0 may receive and buffer a read request for group 0. and the first write request buffer WRB0 may receive and buffer a write request for group 0. The first read request buffer RRB0 and the first write request buffer WRB0 may determine whether the write request and the read request are to be buffered or committed using the PAS information recorded in the programmed access scenario area PAS.

The first data buffer DB0 may receive and buffer data which serve as the target of the read request and the write request. When the read request is committed by the first read request buffer RRB0, the first data buffer DB0 may receive data from the shared memory or local memory and transmit the data to a respective neural core. In addition, when the write request is committed by the first write request buffer WRB0, the first data buffer DB0 may receive data from the neural core (or receive them simultaneously with the write request) and transmit the data to the shared memory or local memory.

The second group area Group 1 may include a second read request buffer RRB1, a second write request buffer WRB1, and a second data buffer DB1. The second group area Group 1 may be formed and operate in the same manner as the first group area Group 0 is formed and operate. In other words, the second read request buffer RRB1, the second write request buffer WRB1, and the second data buffer DB1 may correspond to the first read request buffer RRB0, the first write request buffer WRB0, and the first data buffer DB0, respectively.

Figure 20:
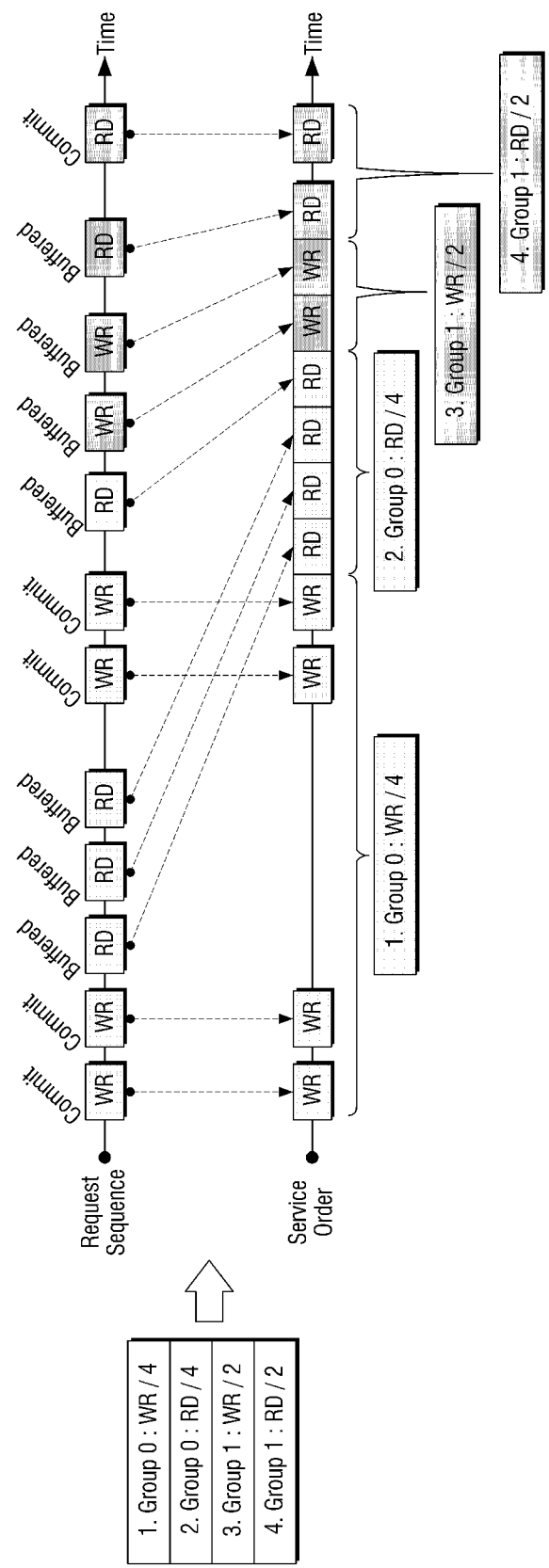
FIG. 20 is a diagram for illustrating a memory access request processing procedure of the PHTM of FIG. 16.

FIG. 20 is a diagram for illustrating a memory access request processing procedure of the PHTM of FIG. 16.

Referring to FIGS. 16 to 20, the PAS information includes four PAS information fields arranged in order of service order. The four PAS information fields are associated with four memory access operation groups, respectively. The first PAS information field indicates that four write operations for the group 0 are required to be performed during the first memory access operation group. The second PAS information field indicates that four read operations for the group 0 are required to be performed during the second memory access operation group. The third PAS information field indicates that two write operations for the group 1 are required to be performed during the third memory access operation group. The fourth PAS information field indicates that two read operations for the group 1 are required to be performed during the fourth memory access operation group.

The upper timeline in FIG. 20 shows the sequence in which requests arrive at the PHTM 500 (Request Sequence), and the lower one is the sequence in which read and write operations are performed in the actual memory (Service Order). In practice, both read and write may be carried out in parallel without having to wait for each other, if possible, but are shown in series as shown in FIG. 20 for the convenience of description.

First, when two write requests WR for group 0 arrive, the PHTM 500 may commit them to perform write operations, since the write operations for group 0 are in the current service order. Subsequently, when three read requests RD for group 0 arrive, the PHTM 500 may buffer them without committing, since the write operations for group 0 are in the current service order and the read operations for group 0 are not in the current service order.

After four write operations for groups required by the first memory access operation group are performed, the PHTM 500 may abort the first memory access operation group and begin the second memory access operation during which four read operations for the group 0 are required to be performed. The PHTM 500 may commit the three buffered read requests RD to perform the three buffered read operations during the second memory access operation.

Since the PHTM 500 performs memory accesses based on the memory access scenario recorded in the programmed access scenario area PAS, the PHTM 500 may not necessarily abort but buffer the three read requests RD received before committing the last two write requests WR. In other words, as the read and write operations are carried out in the order of the pre-programmed groups, the PHTM 500 may proceed with committing and buffering rather than committing and aborting.

In the case of aborting, as the write operation may have to be restarted and a read request RD may have to be received again, the procedural waste can be considerable. If there is no information on the preset scenarios such as the memory access scenario in the programmed access scenario area PAS, aborting may have to be carried out without being able to perform buffering. In contrast, the embodiment can enable the PHTM 500 to perform buffering via the programmed access scenario area PAS, and thus, the efficiency of the memory access operation can be maximized.

The write requests WR and the read requests RD may be temporarily buffered when other write or read operations are currently being carried out. In other words, even if there is no problem in the procedure by the programmed access scenario area PAS, the operation can be performed after waiting for the current operation to be performed.

In some embodiments, after all memory access operation groups indicated by the PAS information ends, new PAS information may be reloaded in the PAS area. In some embodiments, after all memory access operation groups indicated by the PAS information ends, the PAS information may be reused.

Figure 21:
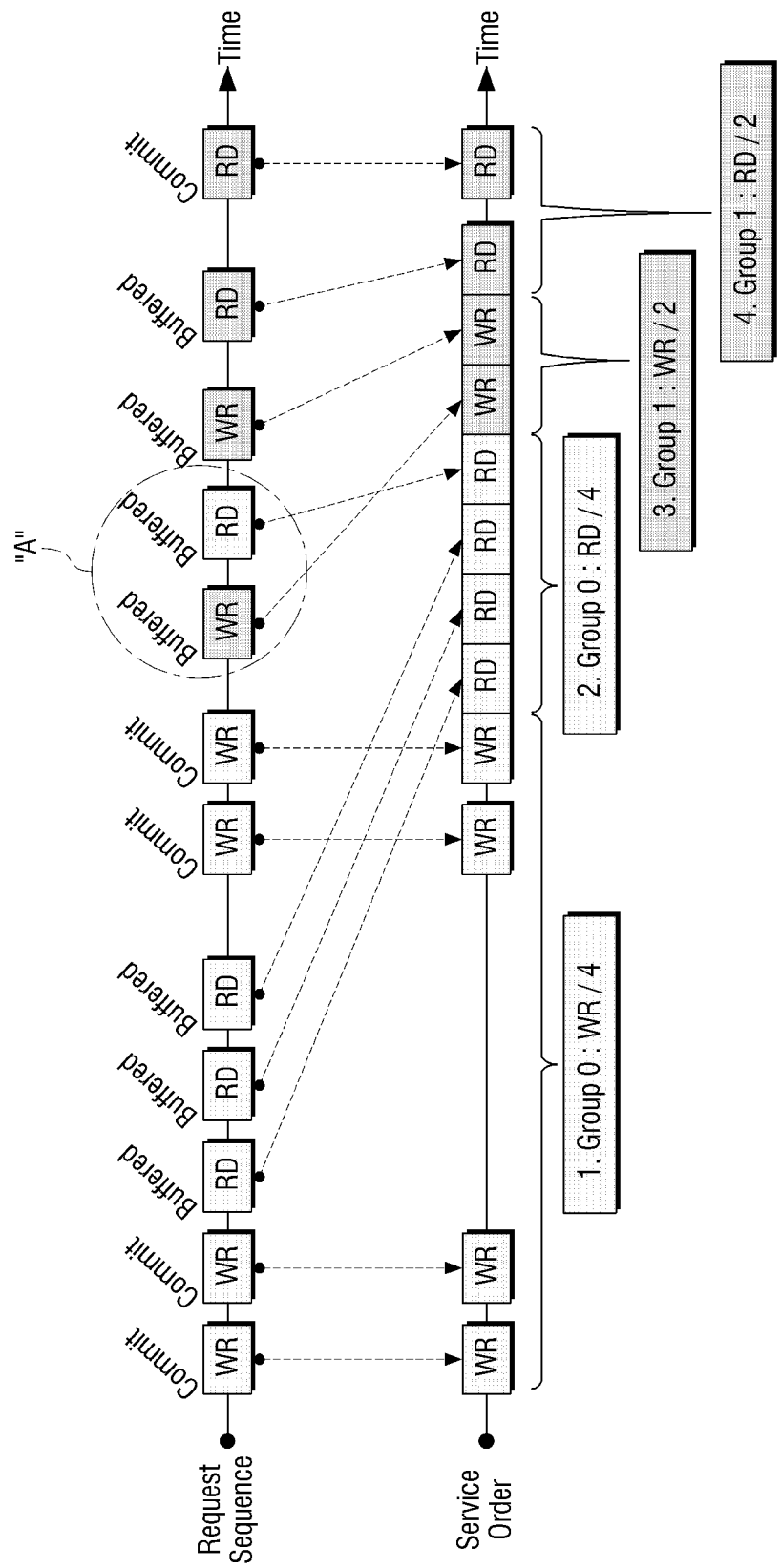
FIG. 21 is a diagram for illustrating a memory access request processing procedure of the PHTM of FIG. 16.

FIG. 21 is a diagram for illustrating a memory access request processing procedure of the PHTM of FIG. 16.

Referring to FIG. 21, in the case of portion A, a group 1 write request WR may be received after the first memory access operation group for group 0 write requests ends. At this time, since it is during the second memory access operation group for group 0 read requests, the group 1 write request WR may not be committed but buffered, and a subsequently received group 0 read request RD may be committed before the group 1 write request WR is committed. Of course, as a read operation for another group 0 read request is currently in progress, the subsequently received group 0 read request RD may be buffered for a short time before it is committed. Since the subsequently received group 0 read request RD satisfies the number of memory accesses required for the second memory access operation group, the PHTM 500 may cease the second memory access operation group and begin the third memory access operation group for the group 1 write request WR.

The neural processing device in accordance with some embodiments of the disclosure can be much faster and more efficient than management by a centralized control processor as each of the neural cores requests a signal for synchronization to the PHTM 500.

Furthermore, unlike the case of being managed simply by software only, an accelerated synchronization management module of the PHTM 500 is added, and thus, the bottleneck phenomenon caused by the concentration of synchronization signals can be prevented.

In addition, since the PHTM 500 can be grouped in advance and receive scenarios according to it, buffering can be performed instead of aborting, and thus, time delays can be prevented as requests are not transmitted again, and efficient read and write operations can be performed.

Hereinafter, a neural processing device in accordance with some embodiments of the disclosure will be described with reference to FIG. 22. The parts overlapping with the embodiments described above will be simplified or omitted.

Figure 22:
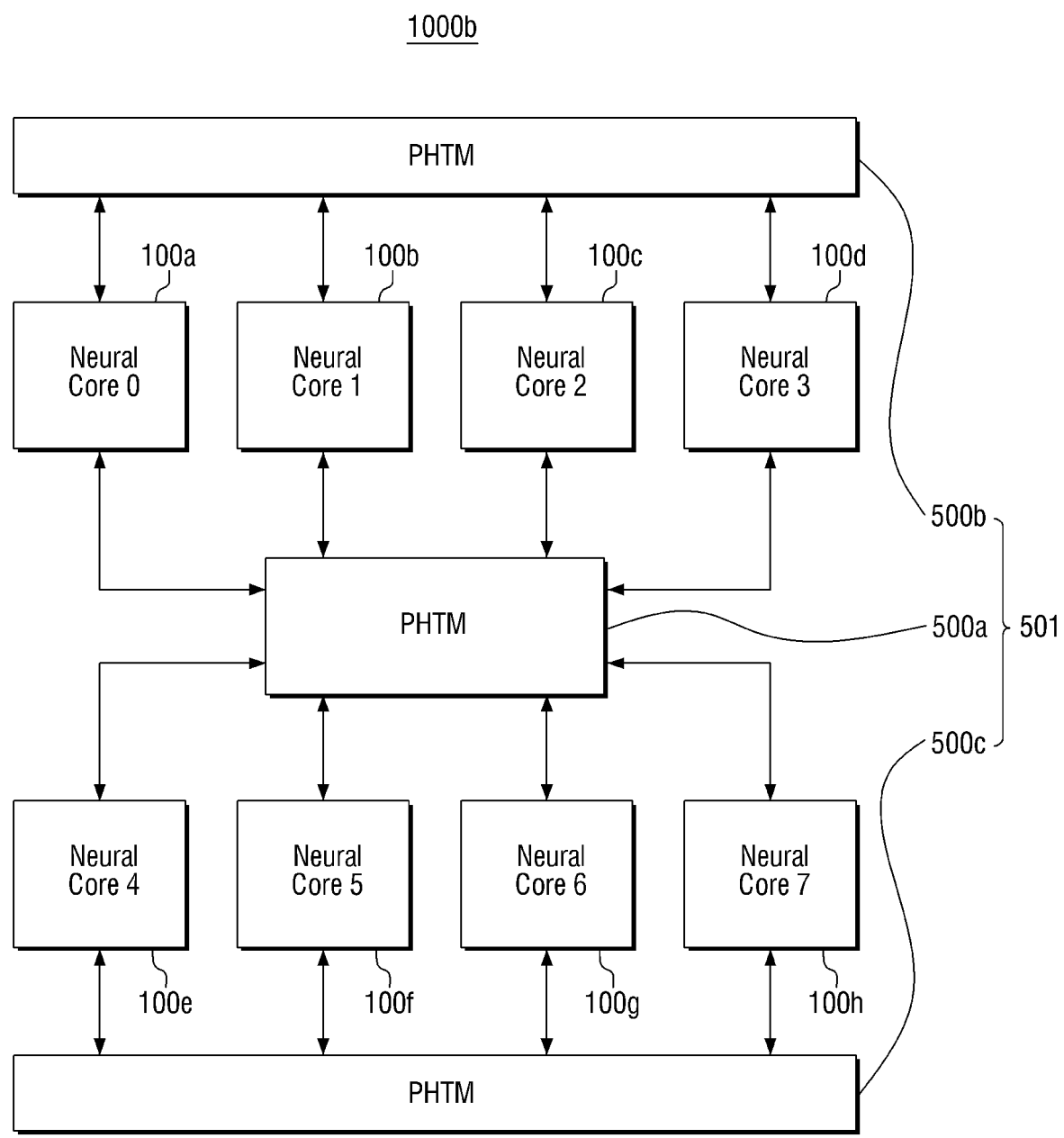
FIG. 22 is a block diagram for illustrating the operation of a neural core and a PHTM of a neural processing device in accordance with some embodiments of the disclosure.

FIG. 22 is a block diagram for illustrating the operation of a neural core and a PHTM of a neural processing device in accordance with some embodiments of the disclosure.

Referring to FIG. 22, a PHTM 501 of a first neural processor 1000b may include a first PHTM 500a, a second PHTM 500b, and a third PHTM 500c.

The first PHTM 500a may connect first to eighth neural cores 100a to 100h to each other. The second PHTM 500b may receive memory access requests of the first to fourth neural cores 100a to 100d. The third PHTM 500c may receive memory access requests of the fifth to eighth neural cores 100e to 100h.

Let the first to fourth neural cores 100a to 100d be defined as a first set and the fifth to eighth neural cores 100e to 100h as a second set. The first PHTM 500a may be a memory that connects the first set of neural cores and the second set of neural cores. In other words, since the entire neural cores need to be all connected to one another in some way, a memory for connecting the two sets, such as the first PHTM 500a, may be required, in addition to locally isolated memories such as the second PHTM 500b and the third PHTM 500c.

The first PHTM 500a does not need to be shared by all eight neural cores, and may also be a memory that connects the first set of neural cores and the second set of neural cores in 1:1.

The embodiment can quickly process memory access requests in parallel by operating the memory in a distributed manner without concentrating all the neural cores on one PHTM. Accordingly, the speed and performance of the entire device can be improved.

Hereinafter, a neural processing device in accordance with some embodiments of the disclosure will be described with reference to FIGS. 23 to 25. The parts overlapping with the embodiments described above will be simplified or omitted.

Figure 23:
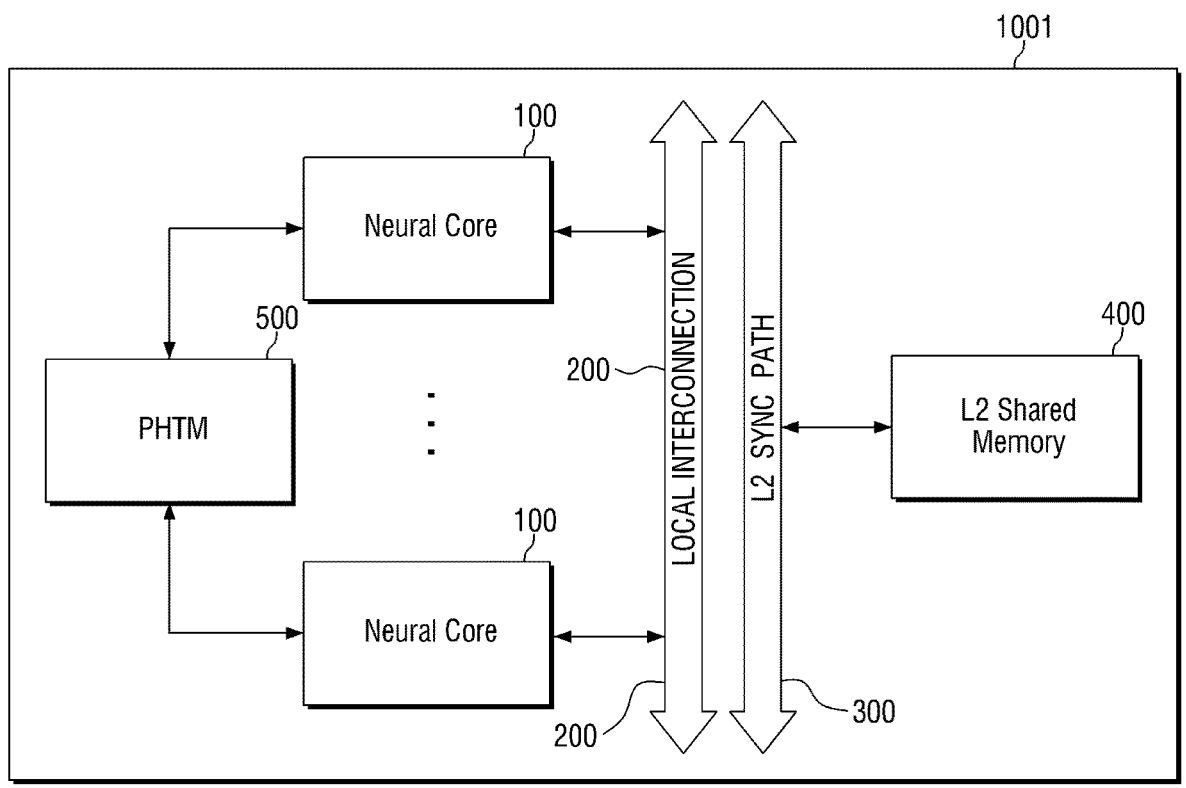
FIG. 23 is a block diagram for illustrating in detail a neural processor in accordance with some embodiments of the disclosure.
Figure 24:
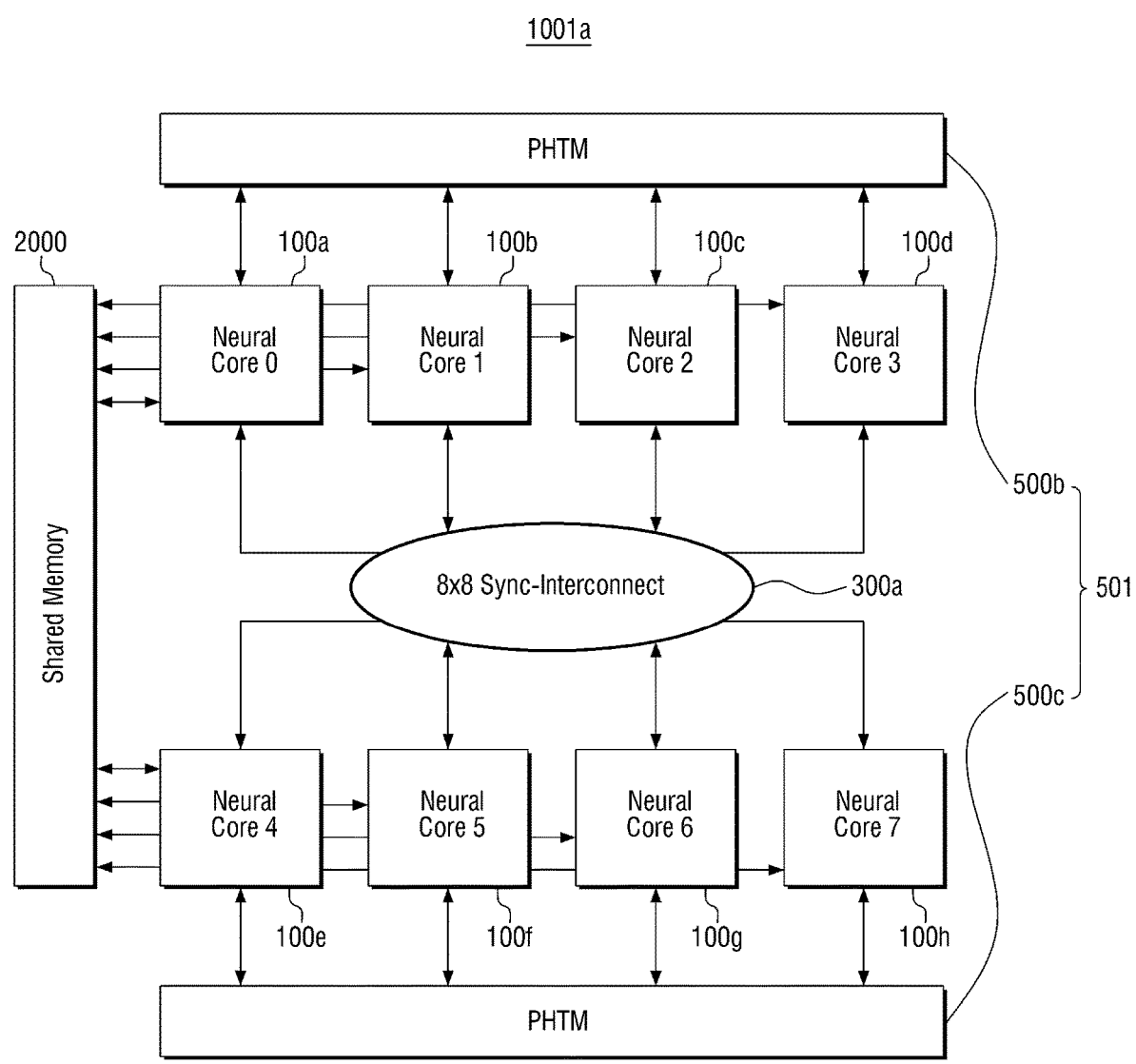
FIG. 24 is a block diagram for illustrating the operation of the neural core and PHTM of FIG. 23.

FIG. 23 is a block diagram for illustrating in detail a neural processor in accordance with some embodiments of the disclosure, and FIG. 24 is a block diagram for illustrating the operation of the neural core and PHTM of FIG. 23. FIG. 25 is a time diagram for illustrating the operation of the first L2 sync path of FIG. 24.

Referring to FIG. 23, a second neural processor 1001 may further include an L2 sync path 300.

The L2 sync path 300 may connect at least one neural core 100 and an L2 shared memory 400 to each other. The L2 sync path 300 may be a path through which synchronization signals of the at least one neural core 100 and the L2 shared memory 400 travel.

The L2 sync path 300 may be formed physically separately from the local interconnection 200. Sufficient channels may not be formed in the local interconnection 200, unlike the global interconnection 6000. Separately forming the L2 sync path 300 may enable the synchronization signal to be transmitted quickly and without any delay. The L2 sync path 300 may be used for synchronization performed at a level one step lower than that of the L3 sync channel 6300 of the global interconnection 6000.

Referring to FIG. 24, a second neural processor 1001a may include a first L2 sync path 300a. Therefore, a PHTM 501 may also include a second PHTM 500b and a third PHTM 500c. but may not include a first PHTM 500a.

The first L2 sync path 300a may receive the respective synchronization signals of the first to eighth neural cores 100a to 100h and transmit them to other neural cores. Accordingly, the neural cores may read or write data from or to the shared memory 2000 (or local memory).

Specifically, the memory access request shared among the first set, i.e., the first to fourth neural cores 100a to 100d, may be provided to the second PHTM 500b. In addition, the memory access request shared among the second set, i.e., the fifth to eighth neural cores 100e to 100h, may be provided to the third PHTM 500c.

However, a memory access request shared by the first set of neural cores and the second set of neural cores with each other may be transmitted to the first L2 sync path 300a and read and write operations may be performed onto the shared memory 2000.

Figure 25:
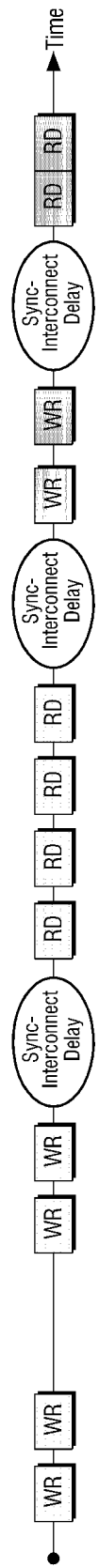
FIG. 25 is a time diagram for illustrating the operation of the first L2 sync path of FIG. 24.

Referring to FIG. 25, in the case of the first L2 sync path 300a, the group 0 read requests RD may be transmitted after all the group 0 write requests WR have first been committed according to the dependency. Accordingly, there may be a synchronization delay (Sync-Interconnect Delay).

The first L2 sync path 300a may have, but not limited to an 8 by 8 form that connects all eight neural cores to one another. In some embodiments, the first L2 sync path 300a may be implemented in a 4 by 4 form that connects the first set and the second set of neural cores in 1:1.

However, the first L2 sync path 300a may be formed of a single wire and may be implemented much simpler than the memory configuration of the PHTM, and as the number of memory access requests is also distributed by the second PHTM 500b and the third PHTM 500c. the bottleneck phenomenon may not be a major problem.

Therefore, the embodiment can have a relatively low level of difficulty in hardware implementation, and resolve the problem of synchronization delays as well.

Hereinafter, a neural processing device in accordance with some embodiments of the disclosure will be described with reference to FIG. 26. The parts overlapping with the embodiments described above will be simplified or omitted.

Figure 26:
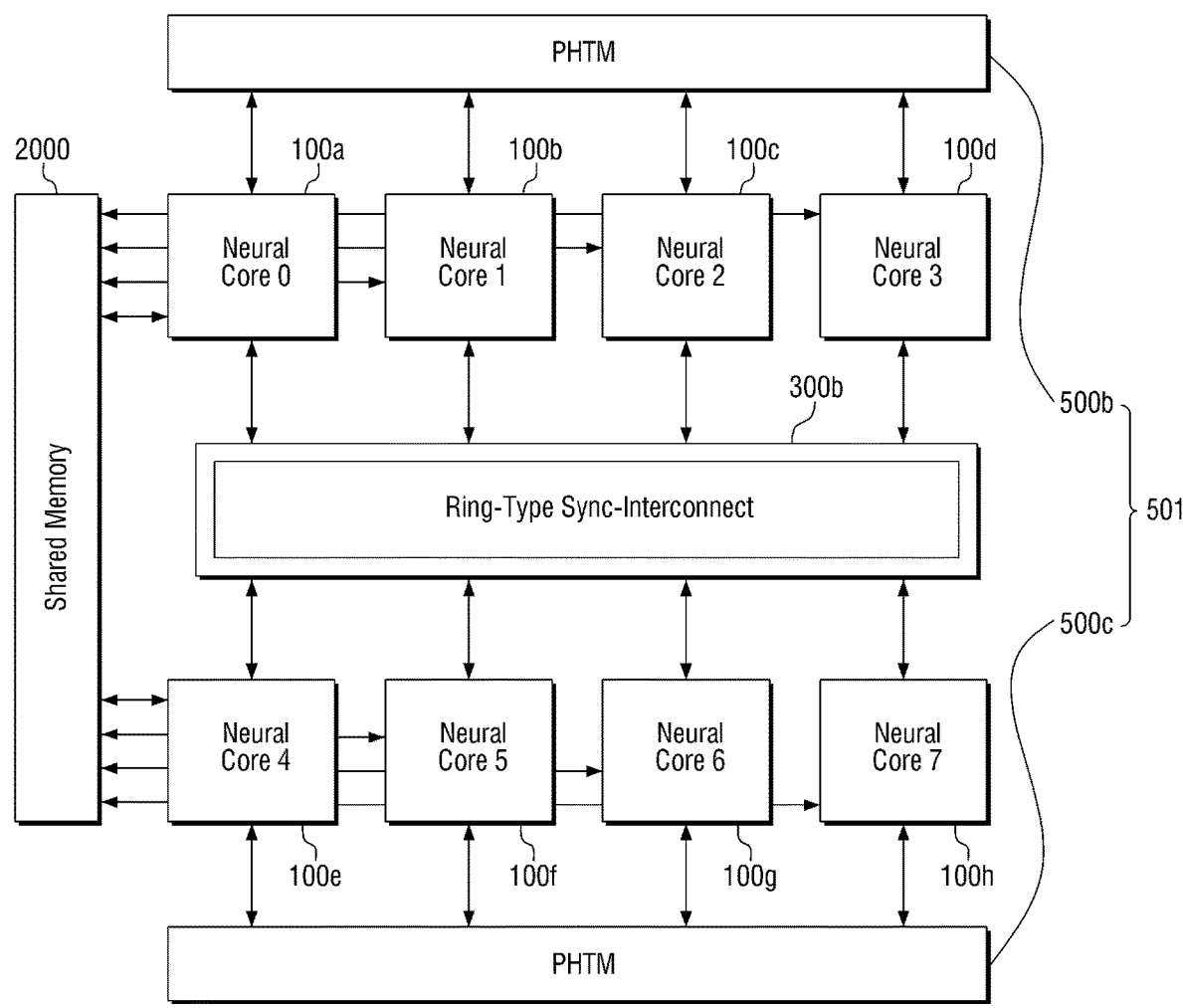
FIG. 26 is a block diagram for illustrating the operation of a neural core and a PHTM of a neural processing device in accordance with some embodiments of the disclosure.

FIG. 26 is a block diagram for illustrating the operation of a neural core and a PHTM of a neural processing device in accordance with some embodiments of the disclosure.

Referring to FIG. 26, a second neural processor 1001b may further include a second L2 sync path 300b. A PHTM 501 may include a second PHTM 500b and a third PHTM 500c, but may not include a first PHTM 500a.

The second L2 sync path 300b may be a ring-shaped interconnect. The ring-shaped interconnect may be sequentially connected between adjacent neural cores. For example, through the second L2 sync path 300b, a first neural core 100a may be connected to a second neural core 100b, and the second neural core 100b may be connected to a third neural core 100c. The third neural core 100c may be connected to a fourth neural core 100d, and the fourth neural core 100*d* may be connected to an eighth neural core 100*h*. The eighth neural core 100*h* may be connected to a seventh neural core 100*g*, and the seventh neural core 100*g* may be connected to a sixth neural core 100*f*. The sixth neural core 100*f* may be connected to a fifth neural core 100*e*, and the fifth neural core 100*e* may be connected to the first neural core 100*a*.

Because the second L2 sync path 300*b* constructed in a ring shape can prevent multiple synchronization signals from being gathered at once, the synchronization delay (Sync-Interconnect Delay) can be minimized.

Hereinafter, a transaction tracking method of a neural processing device in accordance with some embodiments of the disclosure will be described with reference to FIGS. 27 and 28. The parts overlapping with the embodiments described above will be simplified or omitted.

Figure 27:
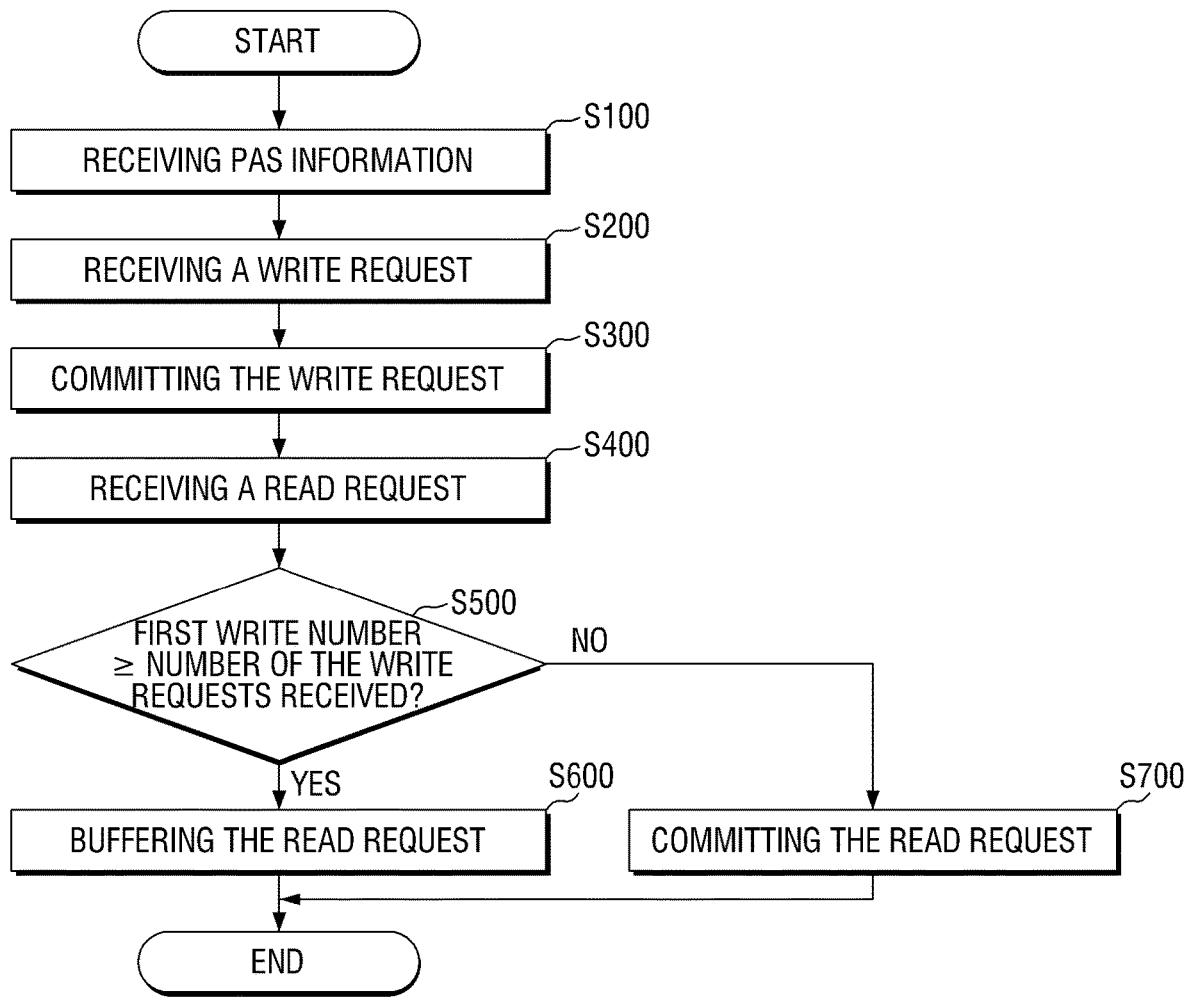
FIG. 27 is a flowchart for illustrating a transaction tracking method of a neural processing device in accordance with some embodiments of the disclosure.
Figure 28:
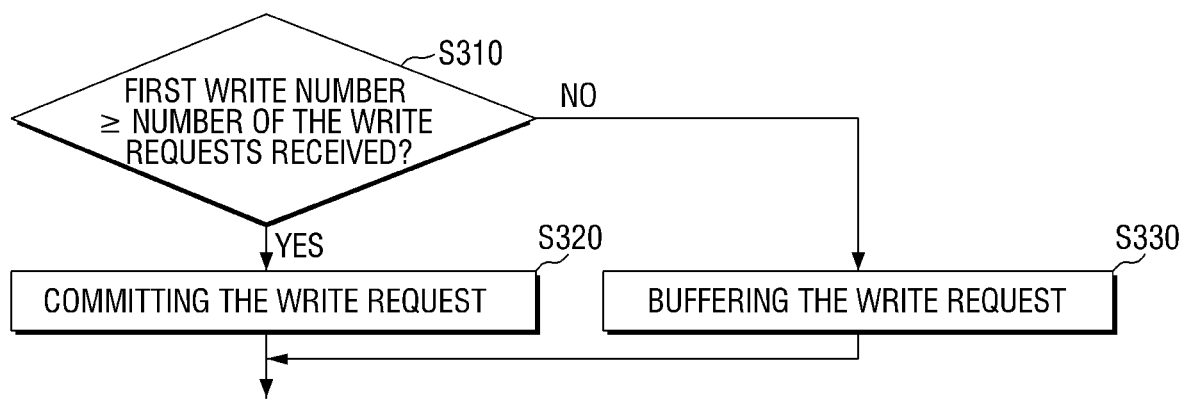
FIG. 28 is a flowchart for illustrating in detail the write request committing step of FIG. 27.

FIG. 27 is a flowchart for illustrating a transaction tracking method of a neural processing device in accordance with some embodiments of the disclosure, and FIG. 28 is a flowchart for illustrating in detail the write request committing step of FIG. 27.

Referring to FIG. 27, the PHTM 500 receives programmed access scenario (PAS) information at S100.

Specifically, referring to FIG. 19, the programmed access scenario area PAS may receive and record, as the PAS information, a write number indicating the number of write requests required to be committed for each group and a read number indicating the number of read requests required to be committed for each group. In this case, the number of write requests assigned in the first group may be represented as a first write number, and the number of read requests assigned in the first group may be represented as a first read number. Similarly, the number of write requests assigned in the second group may be represented as a second write number, and the number of read requests assigned in the second group may be represented as a second read number.

Referring again to FIG. 27, the PHTM 500 may receive a write request at S200, and subsequently may commit the write request at S300.

In detail, referring to FIG. 28, the PHTM 500 may determine whether the first write number is greater than or equal to the number of the write requests received at S310. If the first write number is greater than or equal to the number of the write requests received, the PHTM 500 may commit the write request at S320. If the first write number is less than the number of the write requests received, the PHTM 500 may buffer the write request at S330.

Specifically, referring to FIG. 21, in the case of portion A, a write request WR may be received after the first write number equal to 4 is satisfied. At this time, since the first read number equal to 4, is not yet satisfied, it may be a situation where not all of the memory access requests of the first group have yet been processed. In this case, the write request WR belongs to the second group, and may thus be buffered.

If the write number were greater or equal, the write request WR would have been committed.

Referring again to FIG. 27, the PHTM 500 may receive a read request at S400, and the PHTM 500 may check whether the first write number is greater than or equal to the number of the write requests received at S500. If the first write number is greater than or equal to the number of the write requests received, the PHTM 500 may not immediately commit the read request but buffer the read request at S600. If the first write number is less than the number of the write requests received, the PHTM 500 may commit the read request at S700

Specifically, referring to FIG. 20, when the PHTM 500 receives three read requests RD, the PHTM 500 may buffer them without committing. Since the first write number recorded in the programmed access scenario area PAS is 4, buffering may be carried out because not all write requests have yet arrived.

The buffered read requests RD may be serviced later and the read operations may be performed after the write requests WR satisfy the first write number. In other words, the memory access requests of the first group may be executed before the memory access requests of the second group.

In other words, the embodiment knows the number of requests in advance through the groups, and can thus reduce the overhead of each neural core and carry out an efficient synchronization task by immediately committing or buffering without aborting.

Hereinafter, a transaction tracking method of a neural processing device in accordance with some embodiments of the disclosure will be described with reference to FIG. 29.

Figure 29:
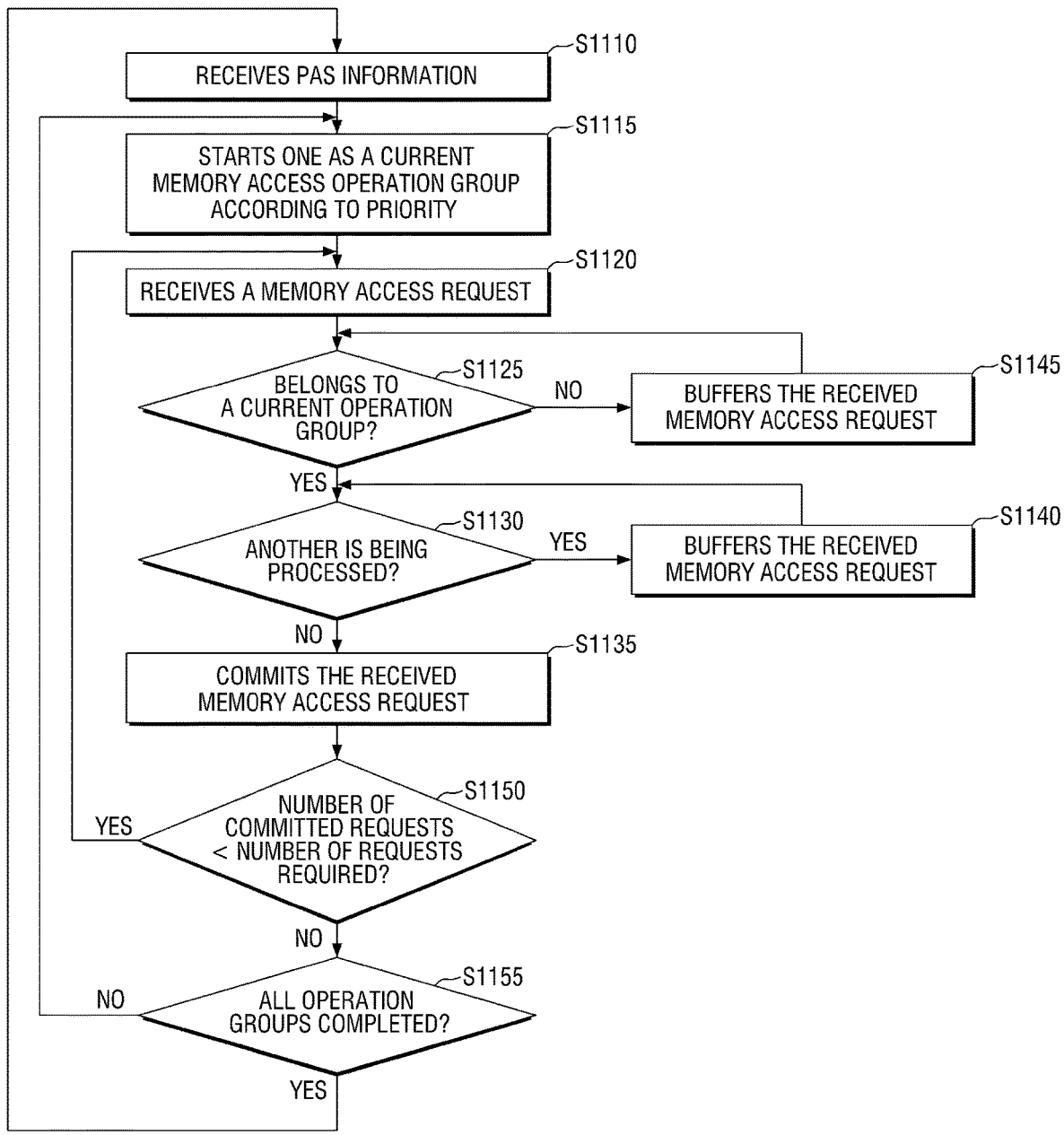
FIG. 29 is a flowchart for illustrating a transaction tracking method of a neural processing device in accordance with some embodiments of the disclosure.

FIG. 29 is a flowchart for illustrating a transaction tracking method of a neural processing device in accordance with some embodiments of the disclosure.

Referring to FIG. 29, at S1110, the PHTM 500 may receive PAS information including memory access scenario for a plurality of memory access operation groups. As described above, the memory access scenario may indicate a group number, a memory access type, a service order, and a number of memory accesses required for each of plurality of memory access operation groups.

At S1115, the PHTM 500 may start one of the plurality of memory access operation groups as a current memory access operation group according to their service orders.

At S1120, the PHTM 500 may receive a memory access request.

At S1125, the PHTM 500 may determine whether the received memory access request belongs to a current memory access operation group. In some embodiments, the PHTM 500 may determine that the received memory access request belongs to a current memory access operation group, when the group number and the memory access type of the received memory access request is the same as the group number and the memory access type of the current memory access operation group. Otherwise, the PHTM 500 may determine that the received memory access request does not belong to a current memory access operation group. The PHTM 500 may determine that the received memory access request belongs to any memory access operation group following the memory access operation group, when the group number and the memory access type of the received memory access request is the same as the group number and the memory access type of any memory access operation group following the memory access operation group.

At S1130, the PHTM 500 may determine whether another memory access request is being processed, if the received memory access request belongs to a current memory access operation group.

At S1135, the PHTM 500 may commit the received memory access request if any memory access request is not being processed.

At S1140, the PHTM 500 may buffer the received memory access request if another memory access request is being processed. The buffered memory access request is committed at S1135 when it is determined at S1130 that any memory access request is not being processed.

At S1145, the PHTM 500 may buffer the received memory access request if the received memory access request belongs to one or more memory access operation groups following the current memory access operation group. The buffered memory access request is committed at S1135 when it is determined at S1125 that the buffered memory access request belongs to the current memory access operation group.

At S1150, the PHTM 500 may determine whether the number of committed memory access requests belonging to the current memory access operation group is less than the number of memory access requests required for the current memory access operation group. The PHTM 500 may go to the operation S1120 and continue to commit memory access requests belonging to the current memory access operation group until the number of committed memory access requests belonging to the current memory access operation group is equal to the number of memory access requests required for the current memory access operation group, if it is determined that the number of committed memory access requests belonging to the current memory access operation group is less than the number of memory access requests required for the current memory access operation group. Otherwise, The PHTM 500 may go to the operation S1155.

At S1155, the PHTM 500 may determine whether all of the plurality of memory access operation groups indicated by the memory access scenario are completed. The PHTM 500 may start the next memory access operation group as a current memory access operation group according to the service order at S1115, if all of the plurality of memory access operation groups indicated by the memory access scenario are not completed. The PHTM 500 may discard current PAS information and may receive new PAS information at S1110, if all of the plurality of memory access operation groups indicated by the memory access scenario are completed.

Figure 30:
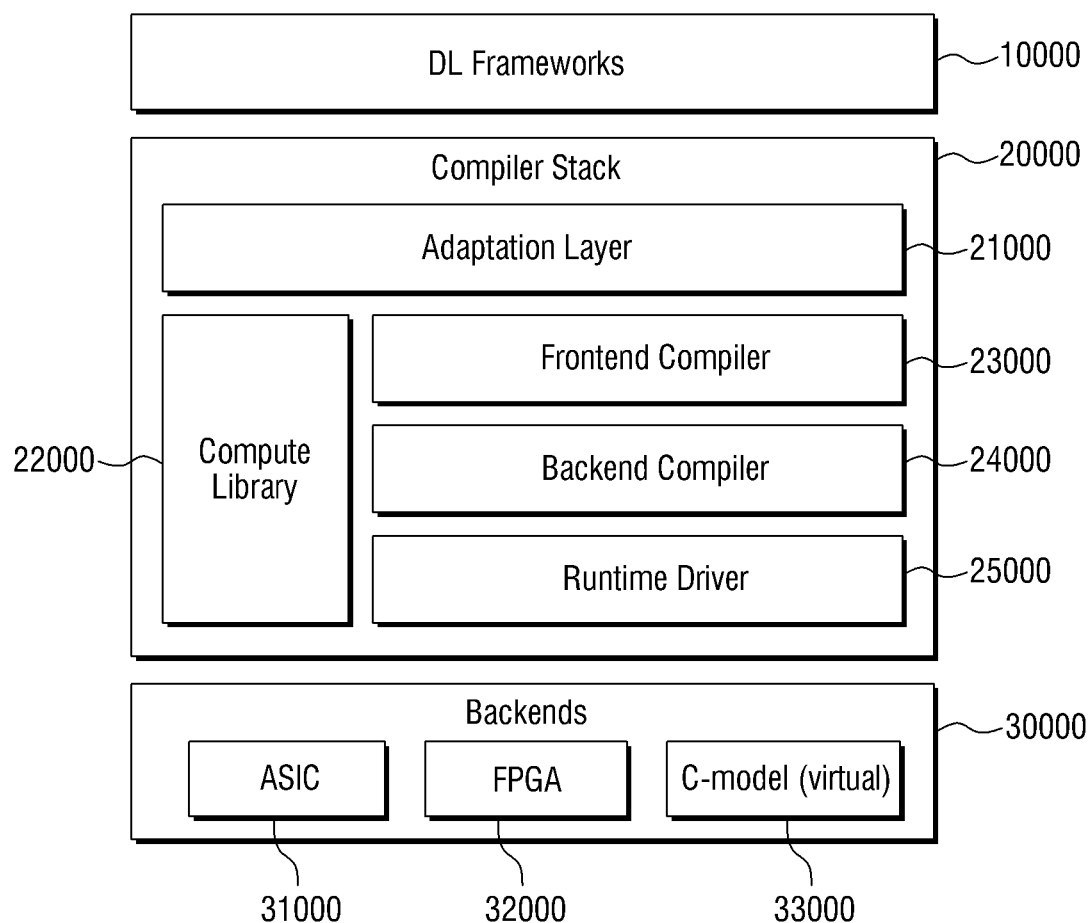
FIG. 30 is a block diagram for illustrating a software hierarchy of a neural processing device in accordance with some embodiments of the disclosure.

FIG. 30 is a block diagram for illustrating a software hierarchy of a neural processing device in accordance with some embodiments of the disclosure.

Referring to FIG. 30, the software hierarchy of the neural processing device in accordance with some embodiments may include a deep learning (DL) framework 10000, a compiler stack 20000, and a back-end module 30000.

The DL framework 10000 may mean a framework for a deep learning model network used by a user. For example, a neural network that has finished training may be generated using a program such as TensorFlow or PyTorch.

The compiler stack 20000 may include an adaptation layer 21000, a compute library 22000, a front-end compiler 23000, a back-end compiler 24000, and a runtime driver 25000.

The adaptation layer 21000 may be a layer in contact with the DL framework 10000. The adaptation layer 21000 may quantize a neural network model of a user generated by the DL framework 10000 and modify graphs. In addition, the adaptation layer 21000 may convert the type of model into a required type.

The front-end compiler 23000 may convert various neural network models and graphs transferred from the adaptation layer 21000 into a constant intermediate representation IR. The converted IR may be a preset representation that is easy to handle later by the back-end compiler 24000.

The optimization that can be done in advance in the graph level may be performed on such an IR of the front-end compiler 23000. In addition, the front-end compiler 23000 may finally generate the IR through the task of converting it into a layout optimized for hardware.

The back-end compiler 24000 optimizes the IR converted by the front-end compiler 23000 and converts it into a binary file, enabling it to be used by the runtime driver. The back-end compiler 24000 may generate an optimized code by dividing a job at a scale that fits the details of hardware.

The compute library 22000 may store template operations designed in a form suitable for hardware among various operations. The compute library 22000 provides the back-end compiler 24000 with multiple template operations required by hardware, allowing the optimized code to be generated.

The runtime driver 25000 may continuously perform monitoring during driving, thereby making it possible to drive the neural network device in accordance with some embodiments. Specifically, it may be responsible for the execution of an interface of the neural network device.

The back-end module 30000 may include an ASIC (application-specific integrated circuit) 31000, an FPGA (field-programmable gate array) 32000, and a C-model 33000. The ASIC 31000 may refer to a hardware chip determined according to a predetermined design method. The FPGA 32000 may be a programmable hardware chip. The C-model 33000 may refer to a model implemented by simulating hardware on software.

The back-end module 30000 may perform various tasks and derive results by using the binary code generated through the compiler stack 20000.

Figure 31:
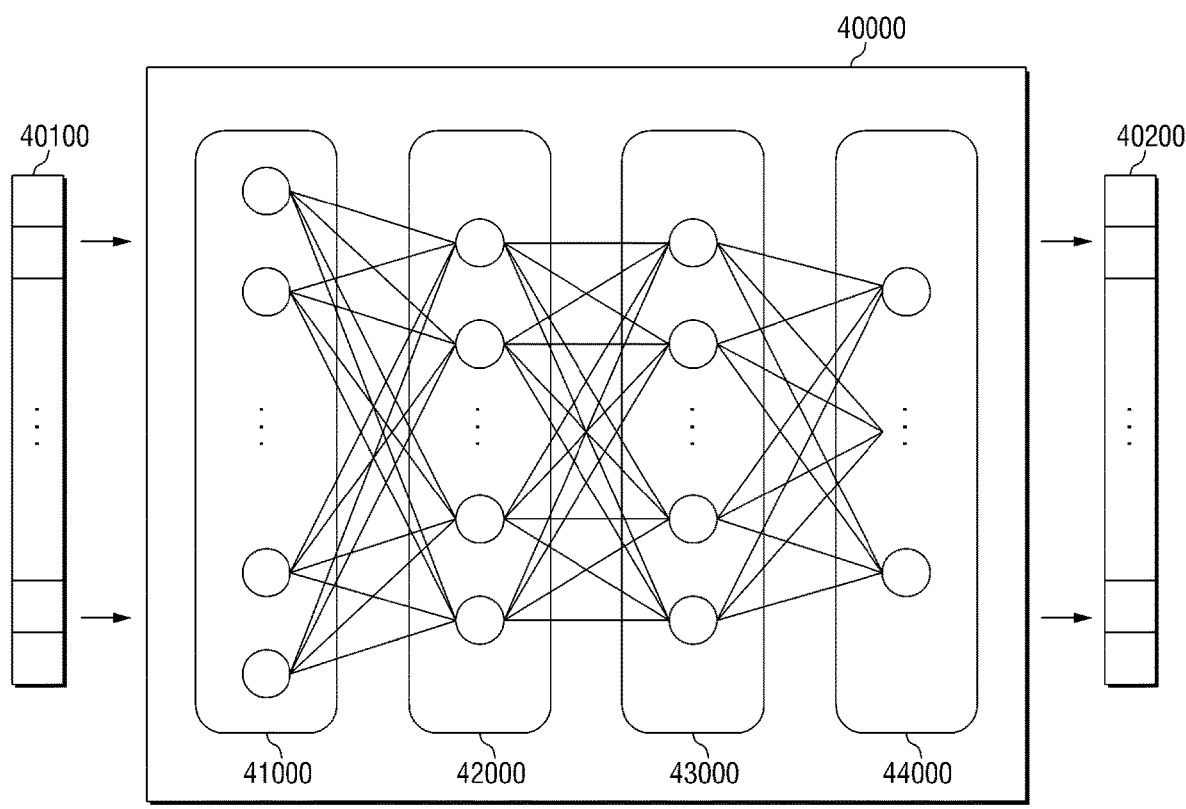
FIG. 31 is a conceptual diagram for illustrating deep learning calculations performed by a neural processing device in accordance with some embodiments of the disclosure.

FIG. 31 is a conceptual diagram for illustrating deep learning calculations performed by a neural processing device in accordance with some embodiments of the disclosure.

Referring to FIG. 31, an artificial neural network model 40000 is one example of a machine learning model, and is a statistical learning algorithm implemented based on the structure of a biological neural network or is a structure for executing the algorithm, in machine learning technology and cognitive science.

The artificial neural network model 40000 may represent a machine learning model having an ability to solve problems by learning to reduce the error between an accurate output corresponding to a particular input and an inferred output by repeatedly adjusting the weight of the synapse by nodes, which are artificial neurons that have formed a network by combining synapses, as in a biological neural network. For example, the artificial neural network model 40000 may include any probabilistic model, neural network model, etc., used in artificial intelligence learning methods such as machine learning and deep learning.

A neural processing device in accordance with some embodiments may implement the form of such an artificial neural network model 40000 and perform calculations. For example, the artificial neural network model 40000 may receive an input image, and may output information on at least a part of an object included in the input image.

The artificial neural network model 40000 may be implemented by a multilayer perceptron (MLP) including multilayer nodes and connections between them. An artificial neural network model 40000 in accordance with the embodiment may be implemented using one of various artificial neural network model structures including the MLP. As shown in FIG. 31, the artificial neural network model 40000 includes an input layer 41000 that receives input signals or data 40100 from the outside, an output layer 44000 that outputs output signals or data 40200 corresponding to the input data, and n (where n is a positive integer) hidden layers 42000 to 43000 that are located between the input layer 41000 and the output layer 44000 and that receive a signal from the input layer 41000, extract characteristics, and forward them to the output layer 44000. Here, the output layer 44000 receives signals from the hidden layers 42000 to 43000 and outputs them to the outside.

The learning methods of the artificial neural network model 40000 include a supervised learning method for training to be optimized to solve a problem by the input of supervisory signals (correct answers), and an unsupervised learning method that does not require supervisory signals.

The neural processing device may directly generate training data, through simulations, for training the artificial neural network model 40000. In this way, by matching a plurality of input variables and a plurality of output variables corresponding thereto with the input layer 41000 and the output layer 44000 of the artificial neural network model 40000, respectively, and adjusting the synaptic values between the nodes included in the input layer 41000, the hidden layers 42000 to 43000, and the output layer 44000, training may be made to enable a correct output corresponding to a particular input to be extracted. Through such a training phase, it is possible to identify the characteristics hidden in the input variables of the artificial neural network model 40000, and to adjust synaptic values (or weights) between the nodes of the artificial neural network model 40000 so that an error between an output variable calculated based on an input variable and a target output is reduced.

Figure 32:
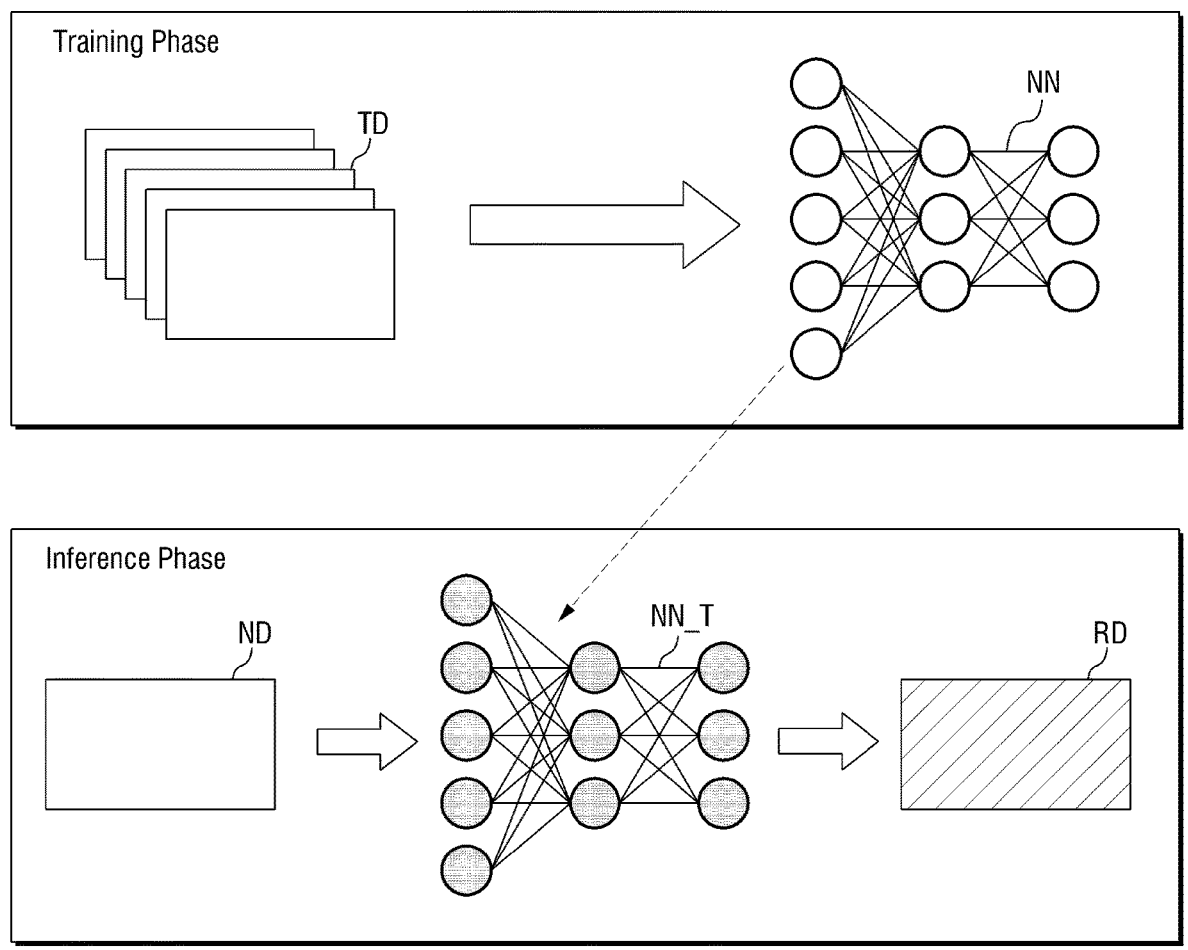
FIG. 32 is a conceptual diagram for illustrating training and inference operations of a neural network of a neural processing device in accordance with some embodiments of the disclosure.

FIG. 32 is a conceptual diagram for illustrating training and inference operations of a neural network of a neural processing device in accordance with some embodiments of the disclosure.

Referring to FIG. 32, the training phase may be subjected to a process in which a large number of pieces of training data TD are passed forward to the artificial neural network model NN and are passed backward again. Through this, the weights and biases of each node of the artificial neural network model NN are tuned, and training may be performed so that more and more accurate results can be derived through this. Through the training phase as such, the artificial neural network model NN may be converted into a trained neural network model NN_T.

In the inference phase, new data ND may be inputted into the trained neural network model NN_T again. The trained neural network model NN_T may derive result data RD through the weights and biases that have already been used in the training, with the new data ND as input. For such result data RD, what training data TD were used in training and how many pieces of training data TD were used in the training phase may be important.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims. It is therefore desired that the embodiments be considered in all respects as illustrative and not restrictive, reference being made to the appended claims rather than the foregoing description to indicate the scope of the disclosure.

Various aspects of the disclosure are described below as examples for convenience, but do not limit the technology.

According to some aspects of the disclosure, a neural processing device includes: first and second neural cores, a shared memory shared by the first and second neural cores with each other, and a programmable hardware transactional memory (PHTM) configured to receive a memory access request to the shared memory of the first and second neural cores and to perform committing or buffering.

According to some aspects, the neural processing device, further includes: third and fourth neural cores that are different from the first and second neural cores, wherein the first and second neural cores are included in a first set, the third and fourth neural cores are included in a second set, and the PHTM includes: a first PHTM configured to receive a first memory access request from the first set, and a second PHTM configured to receive a second memory access request from the second set.

According to some aspects, the PHTM includes: a third PHTM configured to receive a third memory access request from the first and second sets.

According to some aspects, the neural processing device, further includes: an L2 sync path configured to transmit synchronization signals from the first and second sets.

According to some aspects, the L2 sync path performs many-to-many connections among the first to fourth neural cores.

According to some aspects, the L2 sync path performs a one-to-one connection among the second to fourth neural cores.

According to some aspects, the L2 sync path is a ring-shaped interconnection.

According to some aspects, the PHTM includes: a transaction area in which committing or buffering is performed according to the memory access request, and a non-transaction area in which tracking for the memory access request is not performed.

According to some aspects, the transaction area includes first and second transaction areas having different addresses.

According to some aspects, the size of the first transaction area and the size of the second transaction area are different from each other.

According to some aspects, the first transaction area includes: a first group area corresponding to requests associated with a first group, a second group area corresponding to requests associated with a second group different from the first group, and a PAS configured to record set numbers of the requests of the first group and the second group.

According to some aspects, the first group area includes: a read request buffer configured to receive read requests, a write request buffer configured to receive write requests, and a data buffer configured to receive data.

According to some aspects, the PHTM sequentially processes memory access requests associated with the first group and memory access requests associated with the second group.

According to some aspects, the PAS records a first write number, which is the number of write requests to be processed in the first group, and a first read number, which is the number of read requests to be processed in the first group, and when the read requests of the first group are received, the PHTM: buffers the read requests if the number of the write requests received is less than the first write number, and commits the read requests if the number of the write requests received is greater than or equal to the first write number.

According to some aspects of the disclosure, a neural processing device includes: first and second neural cores, a shared memory shared by the first and second neural cores with each other, and a PHTM configured to receive memory access requests to the shared memory of the first and second neural cores, wherein the memory access requests comprise a first group and a second group that are preset, the PHTM comprises first and second write numbers, and first and second read numbers, the first write number is the number of write requests to be processed in the first group, the first read number is the number of read requests to be processed in the first group, the second write number is the number of write requests to be processed in the second group, the second read number is the number of read requests to be processed in the second group, and the PHTM sequentially processes memory access requests by each group according to the first and second write numbers and the first and second read numbers.

According to some aspects, the PHTM: performs buffering when the read requests of the first group are received, if the number of the write requests received of the first group is less than the first write number, and processes the read requests of the first group that have been buffered when the number of the write requests received of the first group gets equal to the first write number.

According to some aspects, the PHTM: performs committing when the read requests of the first group are received, if the number of the write requests received of the first group is equal to or greater than the first write number.

According to some aspects, the PHTM includes: a transaction area configured to process the memory access requests, and a non-transaction area configured not to process the memory access requests.

According to some aspects, the transaction area includes first and second transaction areas.

According to some aspects, the neural processing device, further includes: a first neural processor comprising the first and second neural cores, and a second neural processor different from the first neural processor.

According to some aspects of the disclosure, a transaction tracking method of a neural processing device including a PHTM, includes: receiving a write number and a read number for each group, receiving a write request of a first group, committing the write request of the first group, receiving a read request of the first group, determining whether the number of the write request received of the first group is greater than or equal to the write number, and committing the read request if the number of the write request received of the first group is greater than or equal to the write number.

According to some aspects, the committing the write request of the first group includes: determining whether the write number is greater than or equal to the number of the write requests received of the first group, and committing the write request if the write number is greater than or equal to the number of the write requests received of the first group.

According to some aspects, the committing the write request of the first group includes: buffering the write request if the write number is less than the number of the write requests received of the first group.

According to some aspects, the transaction tracking method of a neural processing device, includes: buffering the read request if the number of the write request received of the first group is less than the write number.

According to some aspects, the transaction tracking method of a neural processing device, includes: receiving a write request of a second group, committing the write request of the second group, receiving a read request of the second group, determining whether the number of the write request received of the second group is greater than or equal to the write number, and committing the read request if the number of the write request received of the second group is greater than or equal to the write number.

According to some aspects, the neural processing device includes: first and second neural cores, and a shared memory shared by the first and second neural cores, wherein the committing the write request comprises writing, by the PHTM, data onto the shared memory.

According to some aspects, the neural processing device further includes third and fourth neural cores, and the PHTM includes: a first PHTM connected to the first and second neural cores, and a second PHTM connected to the third and fourth neural cores.

According to some aspects, the PHTM further includes a third PHTM connecting the first and third neural cores.

According to some aspects, the neural processing device further includes an L2 sync path, and the transaction tracking method of a neural processing device, further includes: transmitting synchronization signals of the first to fourth neural cores through the L2 sync path.

According to some aspects, the L2 sync path is a ring-shaped interconnection, and the transmitting the synchronization signals through the L2 sync path includes transmitting the synchronization signals only to one core adjacent to each of the first to fourth neural cores.

What is claimed is:

1. A neural processing device comprising:
a first set of a plurality of neural cores;
a shared memory shared by the first set of the plurality of neural cores; and
at least one programmable hardware transactional memory (PHTM) configured to receive a memory access request directed to the shared memory from the first set of the plurality of neural cores and configured to commit or buffer the memory access request,
receive a memory access scenario for a plurality of memory access operation groups, wherein the memory access scenario indicates group numbers, memory access types, service orders and numbers of memory accesses, each of the group numbers is associated with a respective one of the plurality of memory access operation groups, each of the memory access types is associated with a respective one of the plurality of memory access operation groups, each of the service orders is associated with a respective one of the plurality of memory access operation groups, each of the numbers of memory accesses is associated with a respective one of the plurality of memory access operation groups,
determine one of the plurality of memory access operation groups defined by the memory access scenario as a current memory access operation group according to the service orders defined by the memory access scenario, and
perform at least one of buffer the received memory access request and commit the received memory access request, in response to the determination of whether the received memory access request belongs to the current memory access operation group.

2. The neural processing device of claim 1, further comprising:
a second set of a plurality of neural cores that are different from the first set of the plurality of neural cores, and
the at least one PHTM comprises:
a first PHTM configured to receive memory access requests from the first set of the plurality of neural cores; and
a second PHTM configured to receive memory access requests from the second set of the plurality of neural cores.

3. The neural processing device of claim 2, wherein the at least one PHTM further comprises:
  a third PHTM configured to receive memory access requests from neural cores including the first set of the plurality of neural cores and the second set of the plurality of neural cores.

4. The neural processing device of claim 2, further comprising:
  an L2 sync path configured to transmit synchronization signals received from neural cores including the first set of the plurality of neural cores and the second set of the plurality of neural cores.

5. The neural processing device of claim 4, wherein the L2 sync path performs many-to-many connections among neural cores including the first set of the plurality of neural cores and the second set of the plurality of neural cores.

6. The neural processing device of claim 4, wherein the L2 sync path performs a one-to-one connection among neural cores including the first set of the plurality of neural cores and the second set of the plurality of neural cores.

7. The neural processing device of claim 6, wherein the L2 sync path is a ring-shaped interconnection.

8. The neural processing device of claim 1, wherein each PHTM of the at least one PHTM comprises:
  one or more transaction regions that commits or buffers memory access requests; and
  a non-transaction region that does not track memory access requests.

9. The neural processing device of claim 8, wherein an address of a transaction region of the one or more transaction regions of a first PHTM of the at least one PHTM is different from an address of another transaction region of the one or more transaction regions of the first PHTM of the at least one PHTM.

10. The neural processing device of claim 9, wherein a size of a transaction region of the one or more transaction regions is different from a size of another transaction region of the one or more transaction regions.

11. The neural processing device of claim 1, wherein each PHTM of the at least one PHTM is further configured to:
  buffer the received memory access request in response to a determination that the received memory access request belongs to one or more memory access operation groups following the current memory access operation group.

12. The neural processing device of claim 11, wherein each PHTM of the at least one PHTM is further configured to:
  commit the received memory access request in response to a determination that the received memory access request belongs to the current memory access operation group and another memory access request is not being processed, and
  buffer the received memory access request in response to a determination that the received memory access request belongs to the current memory access operation group and the another memory access request is being processed.

13. A neural processing device comprising:
  a plurality of neural cores;
  a shared memory shared by the plurality of neural cores; and
  at least one programmable hardware transactional memory (PHTM) connected to the plurality of neutral cores, the at least one PHTM configured to:
    receive a memory access scenario for a plurality of memory access operation groups, wherein the memory access scenario indicates group numbers, memory access types, service orders, and numbers of memory accesses, each of the group numbers is associated with a respective one of the plurality of memory access operation groups, each of the memory access types is associated with a respective one of the plurality of memory access operation groups, each of the service orders is associated with a respective one of the plurality of memory access operation groups, each of the numbers of memory accesses is associated with a respective one of the plurality of memory access operation groups,
    start one of the plurality of memory access operation groups as a current memory access operation group defined by the memory access scenario,
    receive a memory access request directed to the shared memory from at least one of the plurality of neural cores,
    determine whether the received memory access request belongs to the current memory access operation group, and
    perform at least one of buffer the received memory access request and commit the received memory access request, in response to the determination of whether the received memory access request belongs to the current memory access operation group, and commit the received memory access request, in response to the determination that the received memory access request belongs to the current memory access operation group.

14. The neural processing device of claim 13, wherein the at least one PHTM is further configured to:
  determine whether another memory access request is being processed;
  determine that the received memory access request belongs to the current memory access operation group; and
  commit the received memory access request in response to the determination that the another memory access request is not being processed.

15. The neural processing device of claim 14, wherein the at least one PHTM is further configured to:
  buffer the received memory access request in response to the determination that the another memory access request is being processed.

16. The neural processing device of claim 13, wherein the at least one PHTM is further configured to:
  buffer the received memory access request in response to the determination that the received memory access request belongs to a memory access operation group following the current memory access operation group.

17. A transaction tracking method of a neural processing device including at least one programmable hardware transactional memory (PHTM), comprising:
  receiving a memory access scenario for a plurality of memory access operation groups, wherein the memory access scenario indicates group numbers, memory access types, service orders, and numbers of memory accesses, each of the group numbers is associated with a respective one of the plurality of memory access operation groups, each of the memory access types is associated with a respective one of the plurality of memory access operation groups, each of the service orders is associated with a respective one of the plurality of memory access operation groups, each of the numbers of memory accesses is associated with a respective one of the plurality of memory access operation groups;

starting one of the plurality of memory access operation groups as a current memory access operation group defined by the memory access scenario;

receiving a memory access request;

determining that the received memory access request belongs to the current memory access operation group; and performing at least one of buffer the received memory access request and commit the received memory access request, in response to the determination of whether the received memory access request belongs to the current memory access operation group, and committing the received memory access request in response to the determination that the received memory access request belongs to the current memory access operation group.

18. The transaction tracking method of a neural processing device of claim 17, wherein committing the received memory access request comprises:
determining whether another memory access request is being processed; and
committing the received memory access request in response to the determination that the another memory access request is not being processed.

19. The transaction tracking method of a neural processing device of claim 18, wherein committing the received memory access request further comprises:
buffering the received memory access request in response to the determination that the another memory access request is being processed.

20. The transaction tracking method of a neural processing device of claim 17, further comprising:
buffering the received memory access request in response to the determination that the received memory access request belongs to a memory access operation group following the current memory access operation group.

* * * * *